(12) United States Patent
Wang et al.

(10) Patent No.: US 10,882,546 B2
(45) Date of Patent: Jan. 5, 2021

(54) STROLLER

(71) Applicant: Zhongshan Kingmoon Children Products Co. Ltd., Guangdong (CN)

(72) Inventors: Xiaofeng Wang, Guangdong (CN); Shunping Yang, Guangdong (CN)

(73) Assignee: Zhongshan Kingmoon Children Products Co. Ltd., Guangdong (CN)

( * ) Notice: Subject to any disclaimer, the term of this patent is extended or adjusted under 35 U.S.C. 154(b) by 0 days.

(21) Appl. No.: 16/507,001

(22) Filed: Jul. 9, 2019

(65) Prior Publication Data

US 2020/0010106 A1    Jan. 9, 2020

Related U.S. Application Data

(63) Continuation of application No. 16/474,399, filed as application No. PCT/CN2019/077331 on Mar. 7, 2019.

(30) Foreign Application Priority Data

Mar. 7, 2018   (CN) .......................... 2018 1 0186731
Mar. 7, 2018   (CN) ..................... 2018 2 0312244 U
Jun. 22, 2018  (CN) .......................... 2018 1 0647800
Jul. 6, 2018   (WO) ................ PCT/CN2018/094789

(51) Int. Cl.
   *B62B 7/06*   (2006.01)
(52) U.S. Cl.
   CPC .................................... *B62B 7/064* (2013.01)
(58) Field of Classification Search
   CPC ............ B62B 7/064; B62B 7/06; B62B 7/062

USPC ......................................... 280/650, 647, 657
See application file for complete search history.

(56) References Cited

U.S. PATENT DOCUMENTS

| | | | |
|---|---|---|---|
| 5,388,852 A * | 2/1995 | Bigo | ........................ B62B 7/08 280/42 |
| 5,769,447 A | 6/1998 | Huang | |
| 6,062,587 A * | 5/2000 | Cabagnero | ................ B62B 7/08 280/47.38 |
| 8,360,461 B2 | 1/2013 | Henry | |
| 8,439,391 B1 * | 5/2013 | Liu | ........................ B62B 7/064 280/650 |

(Continued)

FOREIGN PATENT DOCUMENTS

| | | |
|---|---|---|
| CN | 101448694 A | 6/2009 |
| CN | 103381846 A | 11/2013 |

(Continued)

*Primary Examiner* — John D Walters
(74) *Attorney, Agent, or Firm* — DLA Piper LLP (US)

(57) ABSTRACT

Embodiments include, but are not limited to, a stroller with a collapsible frame where an upper end of the side armrest rotatably connected to a slider, the lower end of the side armrest rotatably connected to an upper end of the rear leg set, a middle portion of the rear leg set rotatably connected to a lower end of the handlebar set, the upper end of the rear leg set and the lower end of the side armrest rotatably connected to the upper end of the front leg set, the middle portion of the front leg set rotatably connected to the front end of the seat set, the rear end of the seat set rotatably connected to the lower end of the handlebar set, and the slider capable of sliding along the length of the handlebar set, wheel assemblies, and a locking mechanism, between the handlebar set and the slider.

26 Claims, 20 Drawing Sheets

(56) References Cited

U.S. PATENT DOCUMENTS

| | | | |
|---|---|---|---|
| 8,714,581 B2 | 5/2014 | Fritz et al. | |
| D774,993 S | 12/2016 | Zehfuss | |
| D784,209 S | 4/2017 | Young et al. | |
| 9,701,332 B2* | 7/2017 | Zheng | B62B 7/006 |
| 9,796,405 B2* | 10/2017 | Li | B62B 7/062 |
| 9,834,243 B1 | 12/2017 | Zhang | |
| 9,862,400 B2 | 1/2018 | Valdez et al. | |
| 9,937,945 B1 | 4/2018 | Phillips | |
| 2003/0080536 A1 | 5/2003 | Hartenstine et al. | |
| 2010/0301585 A1 | 12/2010 | Katz et al. | |
| 2012/0025492 A1 | 2/2012 | Grintz et al. | |
| 2012/0056408 A1 | 3/2012 | Wu et al. | |
| 2013/0113185 A1 | 5/2013 | Zehfuss et al. | |
| 2015/0353115 A1 | 12/2015 | Zheng | |
| 2016/0046314 A1 | 2/2016 | Zehfuss et al. | |
| 2016/0339940 A1 | 11/2016 | Lee et al. | |
| 2017/0002181 A1 | 1/2017 | Lehmann et al. | |
| 2017/0021851 A1 | 1/2017 | Pujol | |
| 2017/0144686 A1 | 5/2017 | Pujol et al. | |
| 2018/0132446 A1* | 5/2018 | Jakubowski | B62B 9/142 |

FOREIGN PATENT DOCUMENTS

| | | |
|---|---|---|
| CN | 203439083 U | 2/2014 |
| CN | 207931790 U | 5/2014 |
| CN | 203739943 U | 7/2014 |
| CN | 204196969 U | 3/2015 |
| CN | 204688181 U | 10/2015 |
| CN | 204821660 U | 12/2015 |
| CN | 105329304 A | 2/2016 |
| CN | 105438241 | 3/2016 |
| CN | 105480288 A | 4/2016 |
| CN | 205168603 U | 4/2016 |
| CN | 105996587 | 10/2016 |
| CN | 106004966 | 10/2016 |
| CN | 106043399 | 10/2016 |
| CN | 205854238 U | 1/2017 |
| CN | 205890960 | 1/2017 |
| CN | 205890961 | 1/2017 |
| CN | 205971433 U | 2/2017 |
| CN | 106891986 | 6/2017 |
| CN | 107323511 | 11/2017 |
| CN | 206797456 | 12/2017 |
| CN | 105151104 | 1/2018 |
| CN | 207225446 U | 4/2018 |
| CN | 108275192 A | 7/2018 |
| CN | 108860280 A | 11/2018 |
| CN | 208439294 U | 1/2019 |
| DE | 212015000155 | 3/2017 |
| WO | 2005108181 | 11/2005 |
| WO | 2008142082 | 11/2008 |
| WO | 2014047947 | 4/2014 |
| WO | 2016025690 | 2/2016 |
| WO | 2017035600 | 3/2017 |
| WO | 2018009971 | 1/2018 |
| WO | 2018054179 | 3/2018 |
| WO | 2018095078 | 5/2018 |

* cited by examiner

B-B 60
41
4

STROLLER

CROSS REFERENCE

This application is a continuation application and claims priority from U.S. National Phase application Ser. No. 16/474,399, filed Jun. 27, 2019, which claims priority to PCT Application No. PCT/CN2019/077331, filed Mar. 7, 2019, which in turn claims priority from Chinese Application No. CN201810647800.0, filed Jun. 22, 2018, now granted Chinese Patent No. CN108860280, issued Nov. 23, 2018; Chinese Application No. 201810186731.8, filed Mar. 7, 2018; now granted Chinese Patent No. CN108275192; Chinese Application No. 201820312244.7, filed Mar. 7, 2018, now granted Chinese Patent No. CN207931790, issued Oct. 2, 2018; and PCT Application No. PCT/CN2018/094789, filed Jul. 6, 2018, expired, all of which are hereby incorporated by reference in their entireties.

TECHNICAL FIELD

The technical field relates to mechanical, wheeled devices including a stroller, and more particularly to a stroller that is conveniently folded.

BACKGROUND

A stroller is a functional carriage designed to facilitate the outdoor activities of a baby or other small item, greatly reducing the burden of carrying the baby or other small item when going out. In order to facilitate carrying and transportation, conventional strollers are generally foldable in order to reduce space occupation. However, most conventional strollers still have the following defects: 1. They cannot be fully folded and still occupy a large space after being folded, which is not conducive to carrying and transporting; 2. The structure is complex and the production cost is high. 3. Most conventional strollers need to be collapsed manually, and the collapsing operation is rather complicated.

Therefore, it is necessary to design a novel stroller to solve the defects in the prior art.

SUMMARY

An objective of the present invention is to address the defects of the prior art, thereby providing a stroller that has a small size and a simple structure. In order to achieve the above objective, the present invention adopts the following technical solution:

a stroller, comprising: a frame that can be collapsed from an unfolded state to a folded state, the frame comprising a front leg set, a rear leg set, a seat set, a side armrest, a handlebar set, and a slider, the upper end of the side armrest being rotatably connected to the slider, the lower end of the side armrest being rotatably connected to the upper end of the rear leg set, the middle portion of the rear leg set being rotatably connected to the lower end of the handlebar set, at least one of the upper end of the rear leg set and the lower end of the side armrest being rotatably connected to the upper end of the front leg set, the middle portion of the front leg set being rotatably connected to the front end of the seat set, the rear end of the seat set being rotatably connected to the lower end of the handlebar set, in particular via a connecting member, and the slider being capable of sliding along the length of the handlebar set; a front wheel assembly, disposed at a front portion of the bottom of the frame; a rear wheel assembly, disposed at a rear portion of the bottom of the frame; and a locking mechanism (also referred to as locking assembly), disposed between the handlebar set and the slider, the locking mechanism being provided for locking the frame in an unfolded state.

In some aspects of the embodiments disclosed herein, a stroller, may include a frame, which is collapsible from an unfolded state to a folded state, the frame comprising a front leg set, a rear leg set, a seat set, a side armrest, a handlebar set, and a slider, the upper end of the side armrest being rotatably connected to the slider, the lower end of the side armrest being rotatably connected to the upper end of the rear leg set, the middle portion of the rear leg set being rotatably connected to the lower end of the handlebar set, at least one of the upper end of the rear leg set and the lower end of the side armrest being rotatably connected to the upper end of the front leg set, the middle portion of the front leg set being rotatably connected to the seat set, the rear end of the seat set being rotatably connected to the lower end of the handlebar set, in particular via a connecting member, and the slider being capable of sliding along the length of the handlebar set, a front wheel assembly, disposed at a front portion of the bottom of the frame;

a rear wheel assembly, disposed at a rear portion of the bottom of the frame, and a locking mechanism, disposed between the handlebar set and the slider, the locking mechanism being configured to lock the frame in an unfolded state. In some examples, the stroller includes the locking mechanism with a locking pin and a locking hole, the locking pin being disposed on the handlebar set, the locking hole being disposed in the slider, the frame being in a locked state when the locking pin is inserted into the locking hole, and the frame being in an unlocked state when the locking pin is disengaged from the locking hole.

In some examples, the locking pin includes a stopper portion and a locking portion that extends laterally from the stopper portion, the locking portion being inserted into the locking hole, and the stopper portion being limited to one side of the locking hole.

In some examples, the handlebar set includes an upper handlebar set and a lower handlebar set, and a joint head disposed between the upper handlebar set and the lower handlebar set. In some examples, the locking mechanism further includes a spring, a central portion of the locking portion is provided with a cylindrical support portion, the locking portion is recessed with an accommodating space, the lower handlebar set comprises an insert, one end of the spring extends into the accommodating space and abuts against the cylindrical support portion, and the other end of the spring abuts against the insert.

In some examples, the locking mechanism further includes a cord, in particular a steel cord, one end of the cord being connected to the locking pin, the other end of the cord being connected to the joint head.

In some examples, the handlebar set further includes the connecting member connected to the lower end of the lower handlebar set, and the rear end of the seat set is rotatably connected to the connecting member. In some examples, the frame further includes a backrest bar, the backrest bar being rotatably connected to the connecting member.

In some examples, the upper end of the rear leg set is rotatably connected to the upper end of the front leg set, and the upper end of the front leg set is not rotatably connected to the lower end of the side armrest.

In some examples, the upper end of the front leg set is rotatably connected to the lower end of the side armrest, and the upper end of the front leg set is not rotatably connected to the upper end of the rear leg set.

In some examples, the upper end of the front leg set, the upper end of the rear leg set, and the lower end of the side armrest are coaxially hinged. In some examples, the middle portion of the front leg set is rotatably connected to the seat set, in particular to the front end or to a middle portion of the seat set.

Some example embodiments include an automatically collapsible stroller frame, that includes a front leg set (11), the front leg set (11) comprising a front leg bar (111), a rear leg set (12), the rear leg set (12) comprising a rear leg bar (121), a handlebar set (15), the handlebar set (15) comprising a lower handlebar tube (152) and a U-shaped upper handlebar tube (151) that is rotatably disposed at an upper end of the lower handlebar tube (152), the lower handlebar tube (152) being provided with a slider (16) that is slidable along its axial direction, a locking assembly (4) being provided between the lower handlebar tube (152) and the slider (16) for locking or unlocking the slider (16), the lower end of the lower handlebar tube (152) being hinged to the middle portion of the rear leg bar (121), a transmission member (14) being hinged between the slider (16) and the upper portion of the rear leg bar (121), and the upper end of the front leg bar (111) being hinged to the lower end of the transmission member (14) and/or the upper end of the rear leg bar (121), and an elastic member (43), the elastic member (43) being disposed between the front leg bar (111) and the rear leg bar (121) such that when the stroller frame collapses, the front leg bar (111) and the rear leg bar (121) are automatically brought close together under the elastic pulling of the elastic member (43), thereby completing automatic collapsing. In some examples, a seat set (13), the front portion of the seat set (13) being hinged to the middle portion of the front leg bar (111), the rear end of the seat set (13) being hinged to the lower end of the lower handlebar tube (152), in particular via a connecting base (154), and the front end of the elastic member (43) being fixed to the seat set (13), in particular fixed to a front portion or to a middle portion of the seat set. In some examples, further including where the connecting base (154) being connected to the lower end of the lower handlebar tube (152) which is hinged to the middle portion of the rear leg bar (121). In some examples, further including a backrest set (9), the backrest set (9) including a U-shaped backrest bar (91), the end of the backrest bar (91) being hinged to the connecting base (154). In some examples, the rear end of the elastic member (43) is fixed to the connecting base (154) or directly fixed to the rear leg bar (121). In some examples, the locking assembly (4) includes a locking pin (41) disposed in the lower handlebar tube (152) and a locking hole (42) disposed in the slider (16), and the locking pin (41) can penetrate the lower handlebar tube (152) and be elastically engaged in the locking hole (42). In some examples, further including a rotating base (153) is disposed between the lower handlebar tube (152) and the upper handlebar tube (151), and a pull cord is disposed between the rotating base (153) and the locking pin (41). In some examples, the upper handlebar tube (151) is provided with an unlocking member (50) for unlocking or locking the upper handlebar tube (151) so that it is rotatable or fixable relative to the lower handlebar tube (152). In some examples, the upper end of the front leg bar (111), the lower end of the transmission member (14) and the upper end of the rear leg bar (121) are coaxially hinged. In some examples, the upper end of the front leg bar (111) is hinged to the upper end of the rear leg bar (121) and is not hinged to the lower end of the transmission member (14). In some examples, the upper end of the front leg bar (111) is hinged to the lower end of the transmission member (14) and is not hinged to the upper end of the rear leg bar (121). In some examples, the elastic member (43) is a spring or rubber band.

In some example embodiments, a stroller, including a frame which is collapsible from an unfolded state to a folded state, the frame includes a front leg set, a rear leg set, a seat set, a side armrest, a handlebar set, and a slider, the upper portion of the side armrest being rotatably connected to the slider, the lower portion of the side armrest being rotatably connected to the front leg set or to the rear leg set, the rear leg set being rotatably connected to the lower portion of the handlebar set, at least one of the rear leg set and the side armrest being rotatably connected to the front leg set, the front leg set being rotatably connected to the seat set, the seat set being rotatably connected to the lower portion of the handlebar set, in particular via a connecting member, the slider being capable of sliding along the handlebar set, a front wheel assembly, disposed at a front portion of the bottom of the frame, a rear wheel assembly, disposed at a rear portion of the bottom of the frame, and a locking mechanism, disposed between the handlebar set and the slider, the locking mechanism being configured to lock the frame in an unfolded state. In some examples, the lower end of the side armrest being rotatably connected to the upper end of the rear leg set. In some examples, the rear leg set being rotatably connected to the lower end of the handlebar set. In some examples, the middle portion of the rear leg set being rotatably connected to the lower end of the handlebar set. In some examples, at least one of the upper end of the rear leg set and the lower end of the side armrest being rotatably connected to the upper end of the front leg set. In some examples, the middle portion of the front leg set being rotatably connected to the seat set. In some examples, the rear end of the seat set being rotatably connected to the lower end of the handlebar set. In some examples, the locking mechanism comprises a locking pin and a locking hole, the locking pin being disposed on the handlebar set, the locking hole being disposed in the slider, the frame being in a locked state when the locking pin is inserted into the locking hole, and the frame being in an unlocked state when the locking pin is disengaged from the locking hole. In some examples, the handlebar set comprises an upper handlebar set and a lower handlebar set, and a joint head disposed between the upper handlebar set and the lower handlebar set. In some examples, the locking mechanism further comprises a spring, a central portion of a locking portion is provided with a cylindrical support portion, the locking portion is recessed with an accommodating space, the lower handlebar set comprises an insert, one end of the spring extends into the accommodating space and abuts against the cylindrical support portion, and the other end of the spring abuts against the insert. In some examples, the locking mechanism further comprises a linkage member, in particular a pull cord, more in particular a steel cord, one end of the linkage member being connected to the locking pin, the other end of the linkage member being connected to the joint head. In some examples, the handlebar set further comprises the connecting member connected to a lower portion of the lower handlebar set, the middle portion of the rear leg set is rotatably connected to the connecting member via the lower portion of the lower handlebar set, and the rear portion of the seat set is rotatably connected to the connecting member. In some examples, the upper portion of the rear leg set is rotatably connected to the upper portion of the front leg set, and the upper portion of the front leg set is not rotatably connected to the lower portion of the side armrest. In some examples, the upper portion of the front leg set is rotatably connected to the lower portion of the side armrest, and the upper portion of the front leg set is not rotatably connected to the upper end of the rear leg set. In some examples, the upper end of the front leg set, the upper end of the rear leg set, and the lower end of the side armrest are coaxially hinged. In some examples, the middle portion of the front leg set is rotatably connected to the seat set, in particular to the front end or to a middle portion of the seat set.

In some example embodiments, a collapsible stroller frame, is described that includes a front leg set (11), the front leg set (11) comprising a front leg bar (111), a rear leg set (12), the rear leg set (12) comprising a rear leg bar (121), a handlebar set (15) being provided with a slider (16) that is slidable along its axial direction, a locking assembly (4) being provided between the handlebar set (15) and the slider (16) for locking or unlocking the slider (16), the handlebar set (15) being hinged to the rear leg bar (121), a transmission member (14) being hinged between the slider (16) and the rear leg bar (121) or the front leg bar (111), and an elastic member (43) being associated with the front leg bar (111) and the rear leg bar (121) such that when the stroller frame collapses, the front leg bar (111) and the rear leg bar (121) are brought close together under the elastic pulling of the elastic member (43), thereby completing the collapsing. In some examples, the handlebar set (15) comprising a lower handlebar tube (152) and an upper handlebar tube (151) that is rotatably disposed at an upper end of the lower handlebar tube (152), the lower handlebar tube (152) being provided with the slider (16) that is slidable along its axial direction. In some examples, the locking assembly (4) being provided between the lower handlebar tube (152) and the slider (16). In some examples, the lower handlebar tube (152) being hinged to the rear leg bar (121), In some examples, the upper handlebar tube (151) is U-shaped. In some examples, the lower end of the lower handlebar tube (152) being hinged to the rear leg bar (121), in particular to a middle portion thereof. In some examples, the transmission member (14) being hinged between the slider (14) on the one hand and the upper portion of the rear leg bar (121) or the upper portion of the front leg bar (111) on the other hand.

In some examples, the upper end of the front leg bar (111) being hinged to the lower end of the transmission member (14) and/or the upper end of the rear leg bar (121). In some examples, the stroller frame is automatically collapsible, wherein the front leg bar (111) and the rear leg bar (121) are automatically brought close together under the elastic pulling of the elastic member (43), thereby completing the collapsing. In some examples, it further includes a seat set (13), the seat set (13) being hinged to the front leg bar (111), the seat set (13) being hinged to the lower end of the lower handlebar tube (152), in particular via a connecting base (154). In some examples, the front end of the elastic member (43) being fixed to the seat set (13), in particular fixed to a front portion or to a middle portion of the seat set (13). In some examples, the front portion of the seat set (13) being hinged to the middle portion of the front leg bar (111). In some examples, the rear end of the seat set (13) being hinged to the lower end of the lower handlebar tube (152), in particular via the connecting base (154). In some examples, the connecting base (154) being connected to the lower end of the lower handlebar tube (152) which is hinged to the middle portion of the rear leg bar (121). In some examples, further includes a backrest set (9), the backrest set (9) comprising a U-shaped backrest bar (91), the end of the backrest bar (91) being hinged to the connecting base (154). In some examples, the rear end of the elastic member (43) is directly or indirectly fixed to the connecting base (154) or directly fixed to the rear leg bar (121). In some examples, the locking assembly (4) comprises a locking pin (41) disposed in the lower handlebar tube (152) and a locking hole (42) disposed in the slider (16), and the locking pin (41) can penetrate the lower handlebar tube (152) and be elastically engaged in the locking hole (42). In some examples, further including a rotating base (153) is disposed between the lower handlebar tube (152) and the upper handlebar tube (151), and a pull cord is disposed between the rotating base (153) and the locking pin (41). In some examples, the upper handlebar tube (151) is provided with an unlocking member (50) for unlocking or locking the upper handlebar tube (151) so that it is rotatable or fixable relative to the lower handlebar tube (152). In some examples, the upper end of the front leg bar (111), the lower end of the transmission member (14) and the upper end of the rear leg bar (121) are coaxially hinged.

In some examples, the upper end of the front leg bar (111) is hinged to the upper end of the rear leg bar (121) and is not hinged to the lower end of the transmission member (14). In some examples, the upper end of the front leg bar (111) is hinged to the lower end of the transmission member (14) and is not hinged to the upper end of the rear leg bar (121). In some examples, the elastic member (43) is a spring or rubber band.

In some example aspects, the embodiments have the following example beneficial effects: after the locking mechanism is unlocked, the frame of the stroller can be collapsed from an unfolded state to a folded state, and the front leg set, the rear leg set, the seat set, the side armrest, and the handlebar set can be relatively rotated; thus, the frame of the stroller is fully folded to reduce the space occupied by the stroller, allowing easy carrying and transportation. In addition, the present invention has the advantages of a simple structure, easy production and assembly, and a low production cost.

In some example aspects, the technical problem to be solved by the present invention is to provide an automatically collapsible stroller frame to make the collapsing operation more convenient and faster.

BRIEF DESCRIPTION OF THE DRAWINGS

Specific example, non-limiting embodiments are further described in detail below with reference to the accompanying drawings, wherein.

Figure 1:
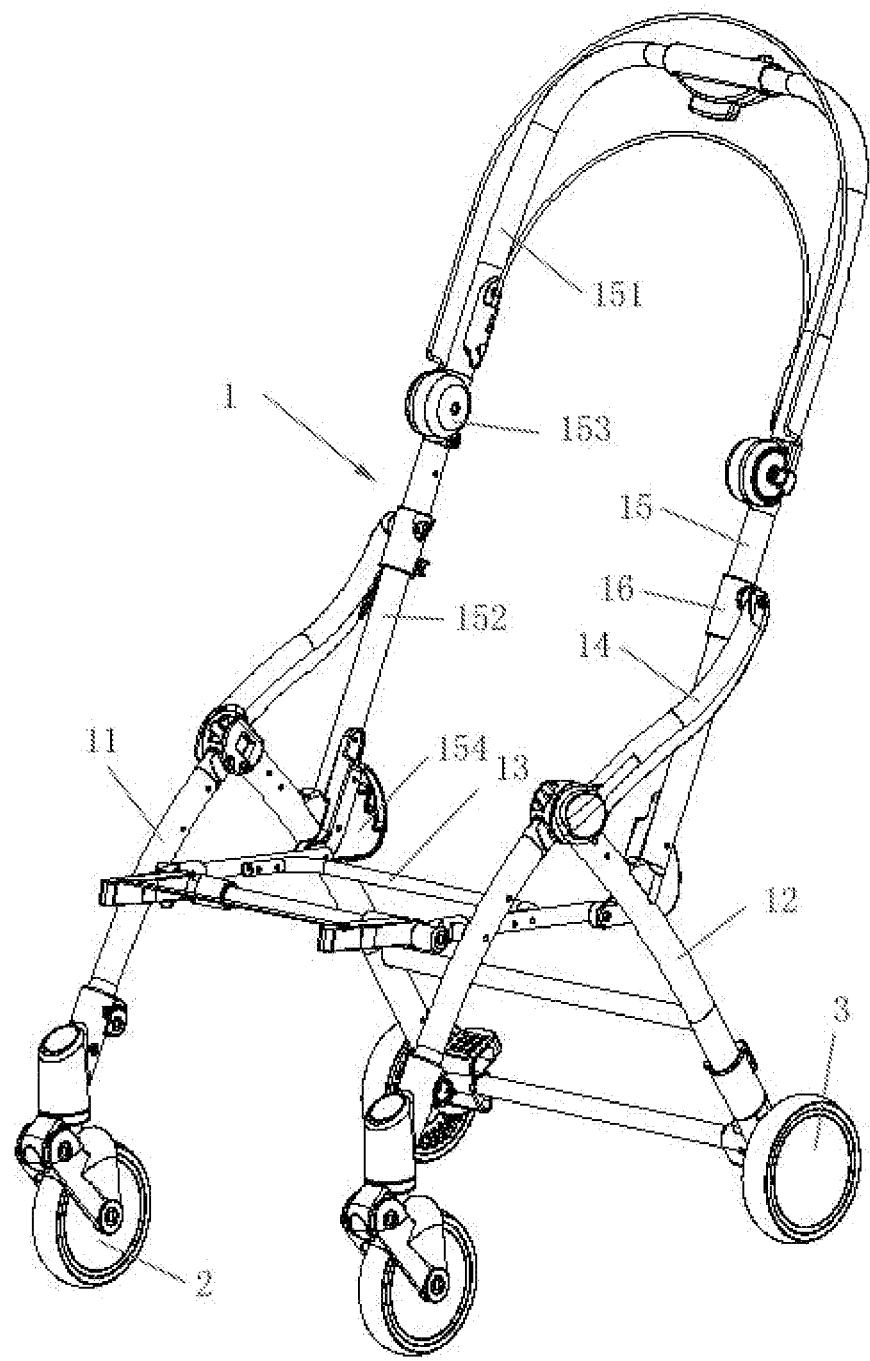
FIG. 1 is a perspective view of the frame of the present invention in an unfolded state.

Example descriptions of the reference numerals, none of which are intended to be limiting, but merely an example: Frame 1; Front leg set 11; Front leg bar 111; Rear leg set 12; Rear leg bar 121; Seat set 13; Side armrest/Transmission member 14; Handlebar set 15; Upper handlebar set 151; Lower handlebar set 152; Insert 1521; Joint head 153; Connecting member 154; Tooth portion 1541; Slider 16; Backrest set 9; Backrest bar 91; Front wheel assembly 2; Rear wheel assembly 3; Locking mechanism 4; Locking pin 41; Stopper portion 411; Locking portion 412; Cylindrical support portion 4121; Accommodating space 4122; Locking hole 42; Spring 43; Unlocking member 50; Pull cord 60, none of which are intended to be limiting, but merely an example.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the disclosures to these particular embodiments.

One example aspect of the present invention will be further described below with reference to the drawings and specific embodiments in order to facilitate a better understanding of the objective, structure, characteristics, and effects of the present invention.

Figure 2:
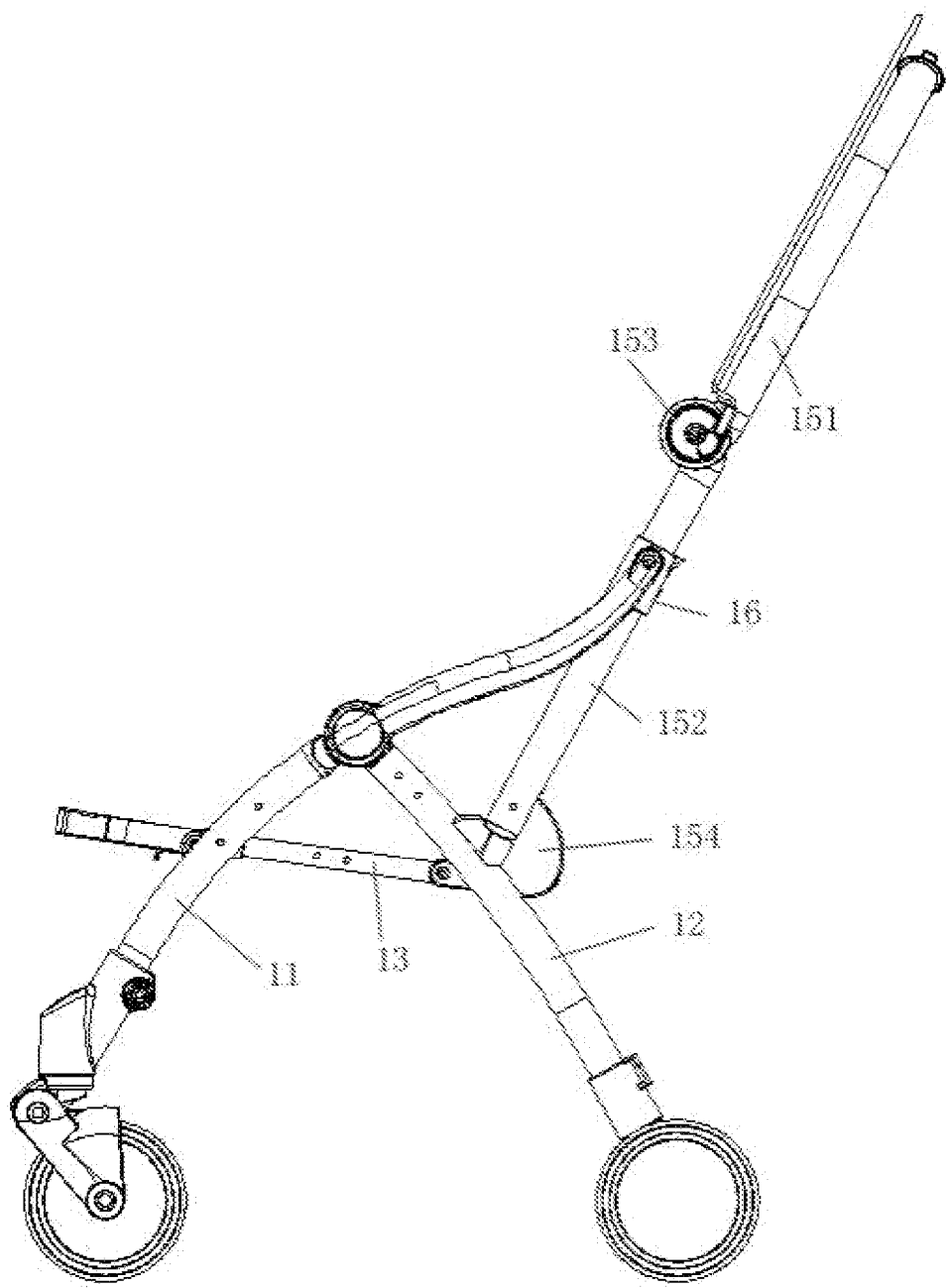
FIG. 2 is a lateral view of the frame of the present invention in an unfolded state.
Figure 3:
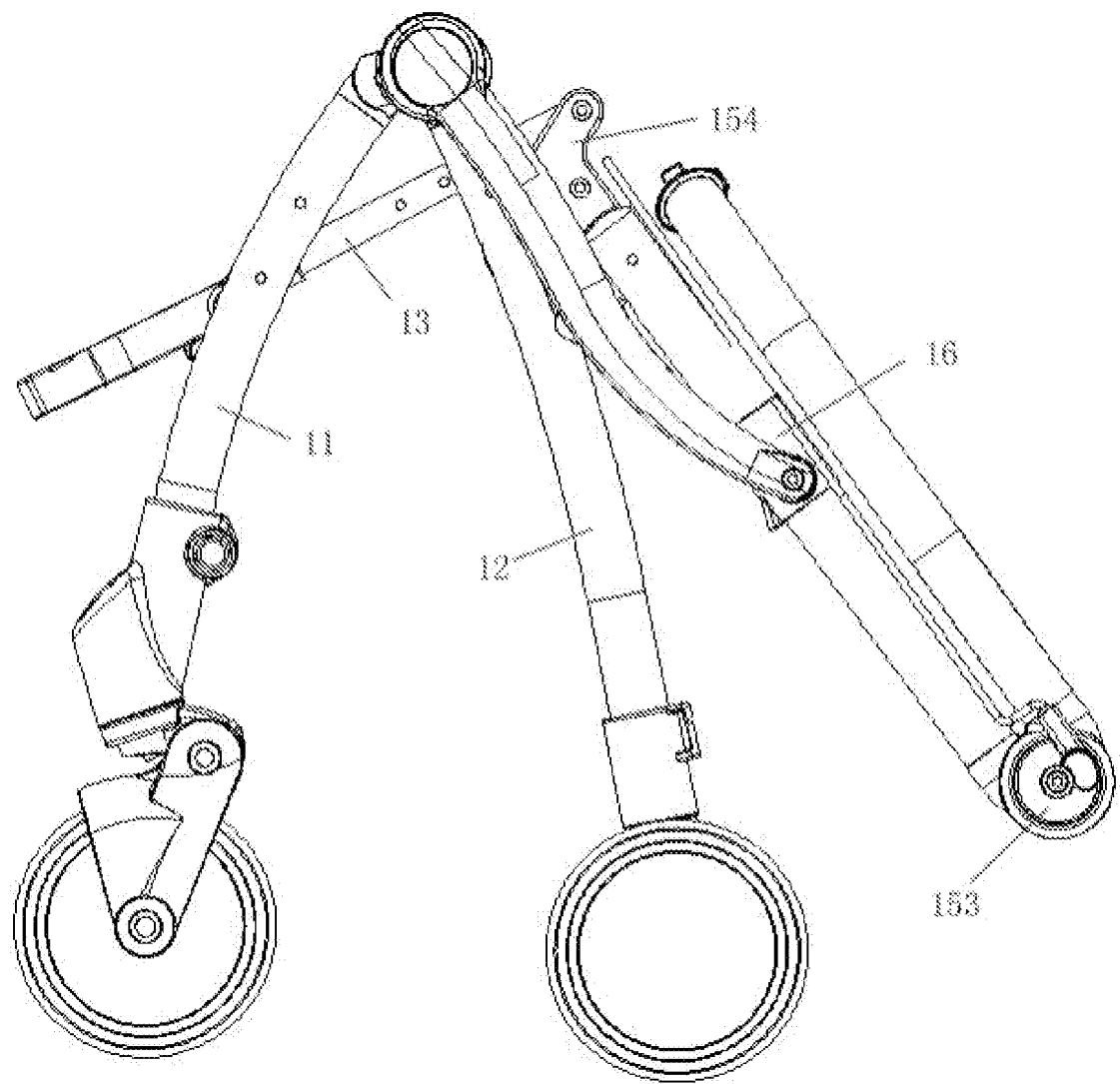
FIG. 3 is a schematic view of the process of folding the frame of the present invention.
Figure 4:
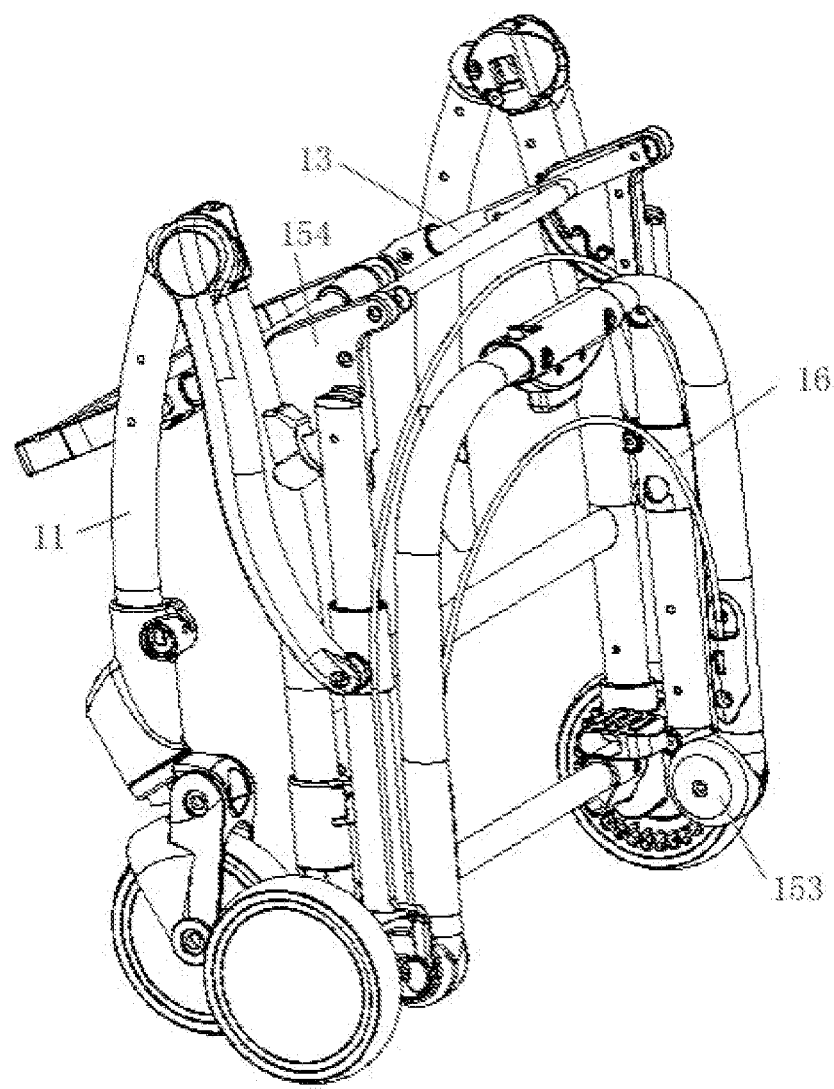
FIG. 4 is a perspective view of the frame of the present invention in a folded state.
Figure 5:
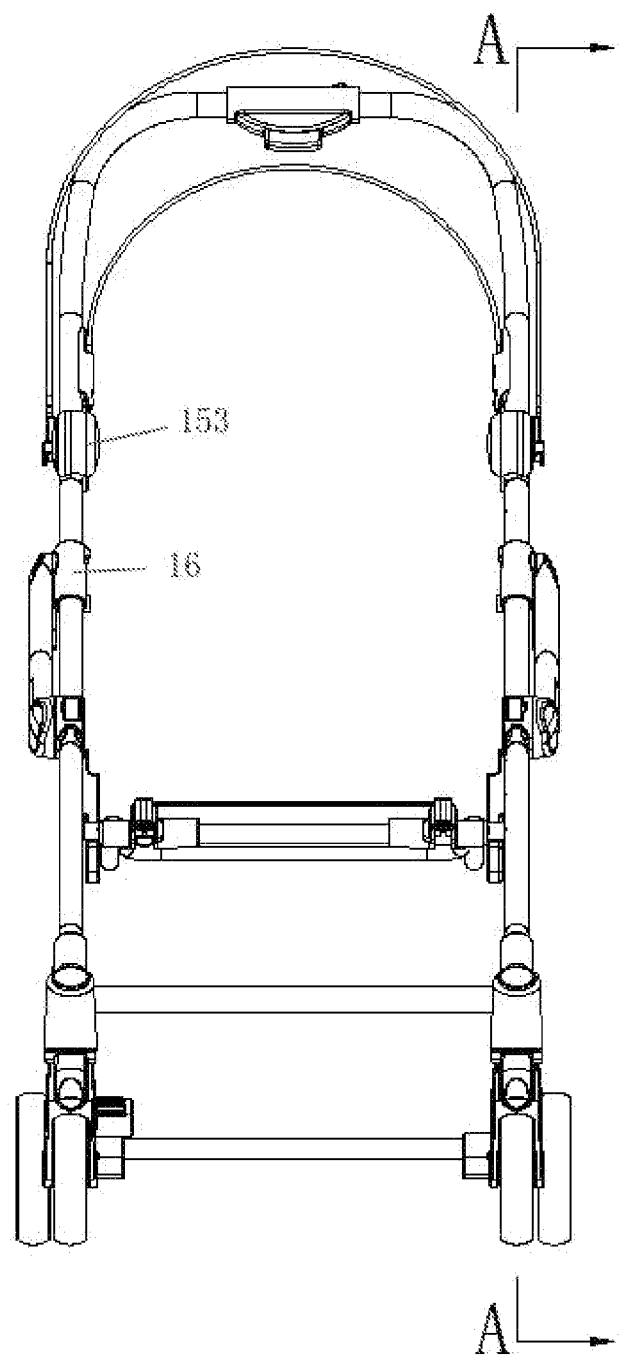
FIG. 5 is a front view of the frame of the present invention in an unfolded state.

As shown in FIG. 1 and FIG. 2, a stroller according to a preferred embodiment of the present invention comprises a frame 1, a front wheel assembly 2 disposed at a front portion of the bottom of the frame 1, a rear wheel assembly 3 disposed at a rear portion of the bottom of the frame 1, and a locking mechanism 4 disposed on the frame 1.

As shown in FIGS. 1 to 4, the frame 1 can be collapsed from an unfolded state to a folded state. The frame 1 comprises a front leg set 11, a rear leg set 12, a seat set 13, a side armrest 14, a handlebar set 15, and a slider 16. The upper portion of the side armrest 14 is rotatably connected to the slider 16. The lower portion of the side armrest 14 is rotatably connected to the front leg set 11 or to the rear leg set 12. The rear leg set 12 is rotatably connected to the lower portion of the handlebar set 15. At least one of the rear leg set 12 and the side armrest 14 is rotatably connected to the front leg set 11. The front leg set 11 is rotatably connected to the seat set 13. The seat set 13 is rotatably connected to the lower portion of the handlebar set 15, in particular via a connecting member 154. The slider 16 is capable of sliding along the handlebar set 15.

In an embodiment, the upper end of the side armrest 14 is rotatably connected to the slider 16. The lower end of the side armrest 14 is rotatably connected to the upper end of the rear leg set 12. The rear leg set 12, in particular the middle portion of the rear leg set, is rotatably connected to the lower end of the handlebar set 15.

Figure 11:
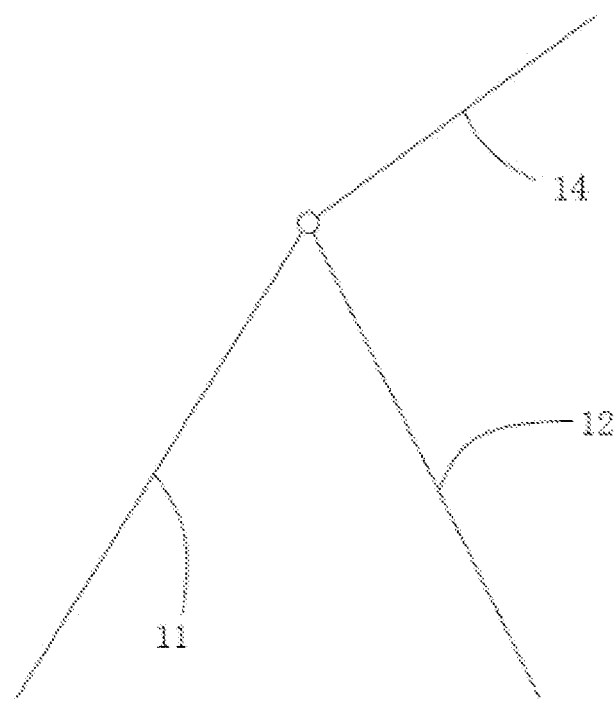
FIG. 11 is a schematic view showing an example embodiment of the connection relationship between the front leg set, the rear leg set, and the side armrest according to the present invention.

At least one of the upper end of the rear leg set 12 and the lower end of the side armrest 14 is rotatably connected to the upper end of the front leg set 11. In this embodiment, the upper end of the rear leg set 12, the lower end of the side armrest 14, and the upper end of the front leg set 11 are coaxially hinged, and their connection relationship is shown in FIG. 11. The middle portion of the front leg set 11 is rotatably connected to the seat set 13, in particular to the front end or to a middle portion of the seat set 13, and the rear end of the seat set 13 is rotatably connected to the lower end of the handlebar set 15, in particular via the connecting member 154. The slider 16 can be slid along the length of the handlebar set 15. In the present embodiment, the front wheel assembly 2 is rotatably connected to the lower end of the front leg set 11, and the rear wheel assembly 3 is rotatably connected to the lower end of the rear leg set 12.

Figure 6:
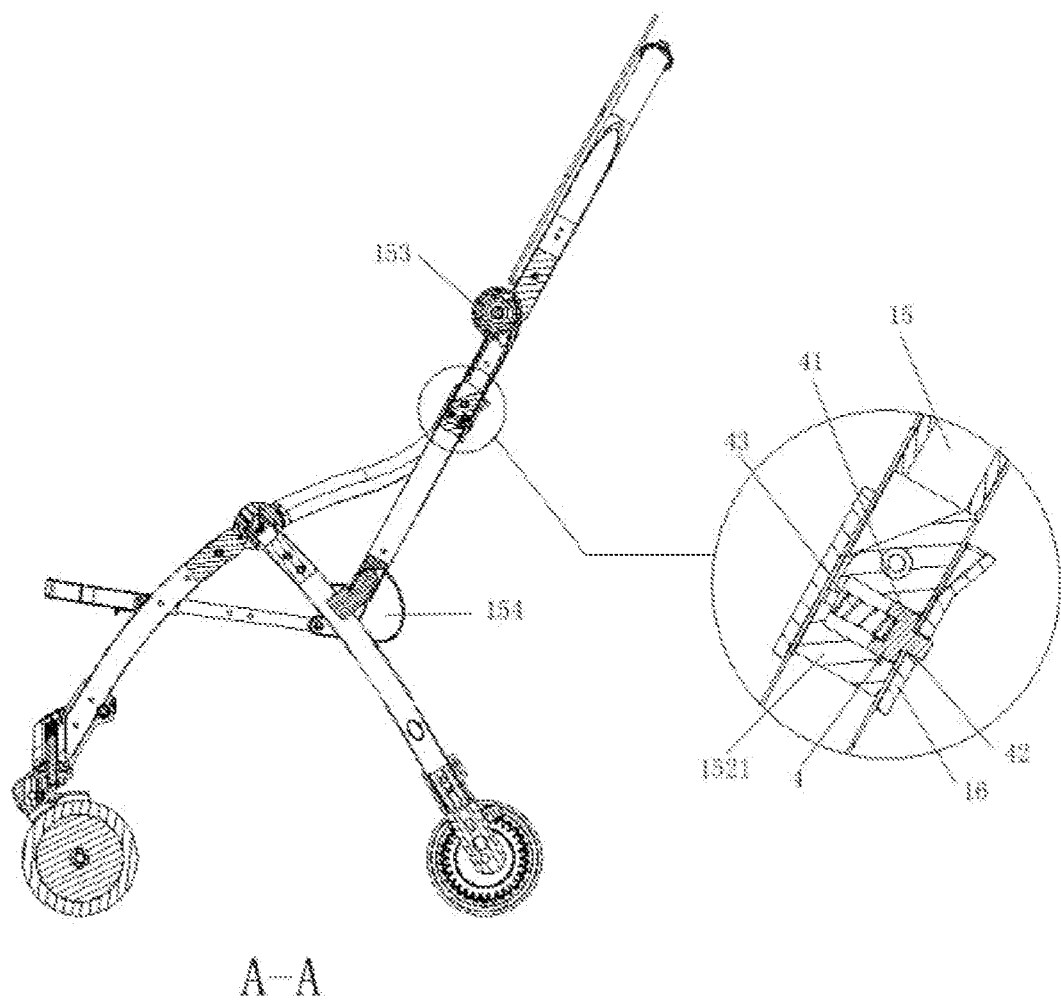
FIG. 6 is a cross-sectional view taken along line A-A of FIG. 5 and an enlarged view of the locking mechanism in the locked state.
Figure 7:
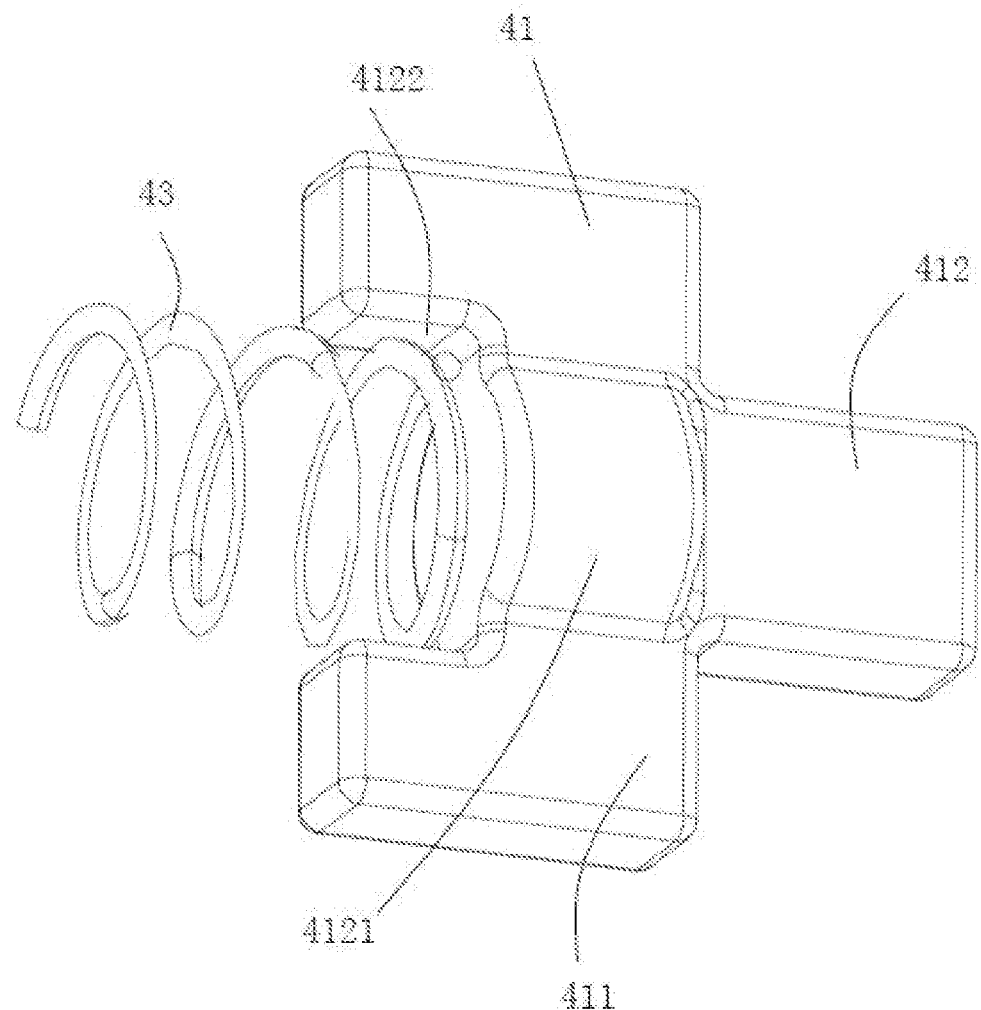
FIG. 7 is a schematic view of the locking pin and spring of the present invention.
Figure 8:
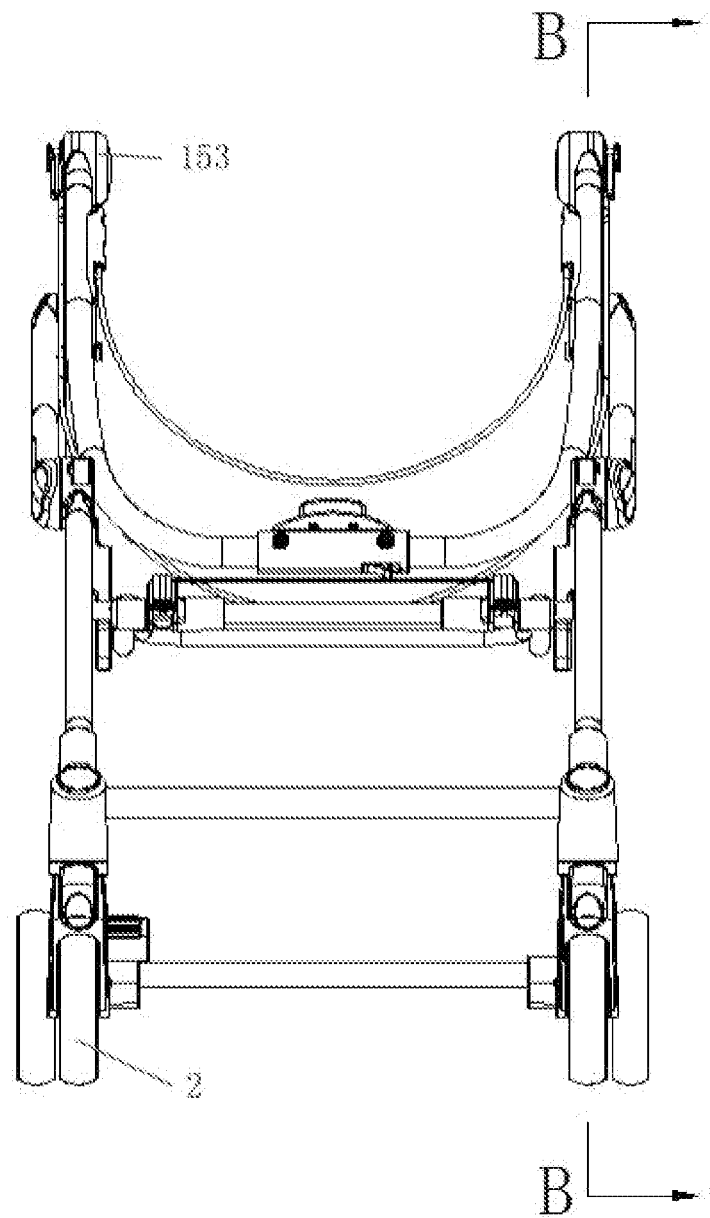
FIG. 8 is a schematic view of the upper handlebar set of the present invention when folded.
Figure 9A:
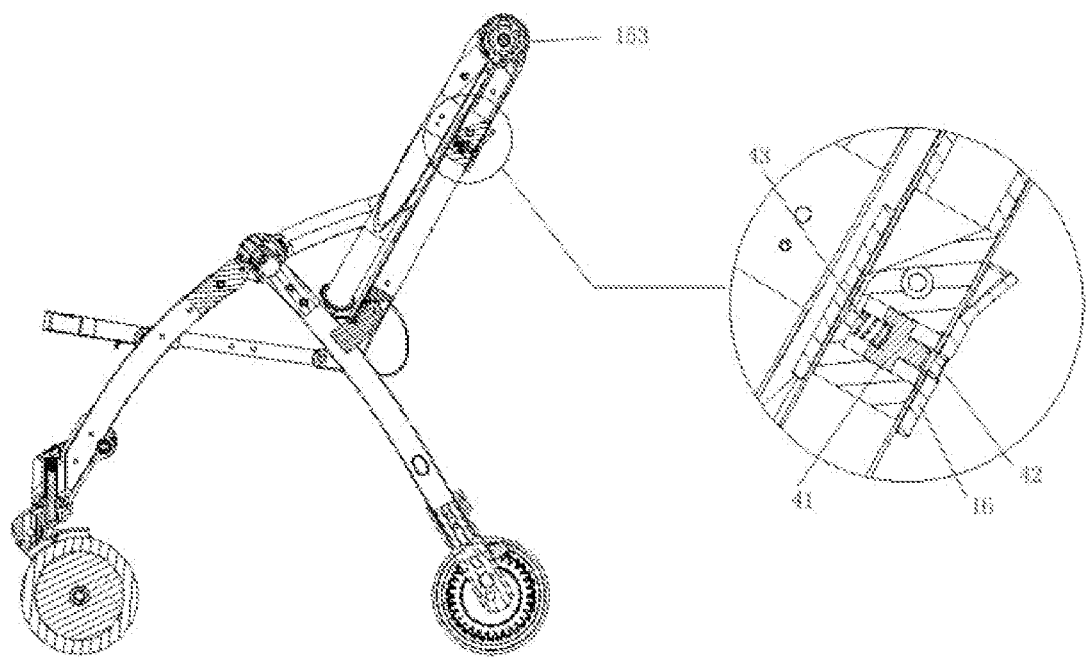
FIG. 9A is a cross-sectional view taken along line B-B of FIG. 8 and an enlarged view of the locking mechanism in the unlocked state.
Figure 9B:
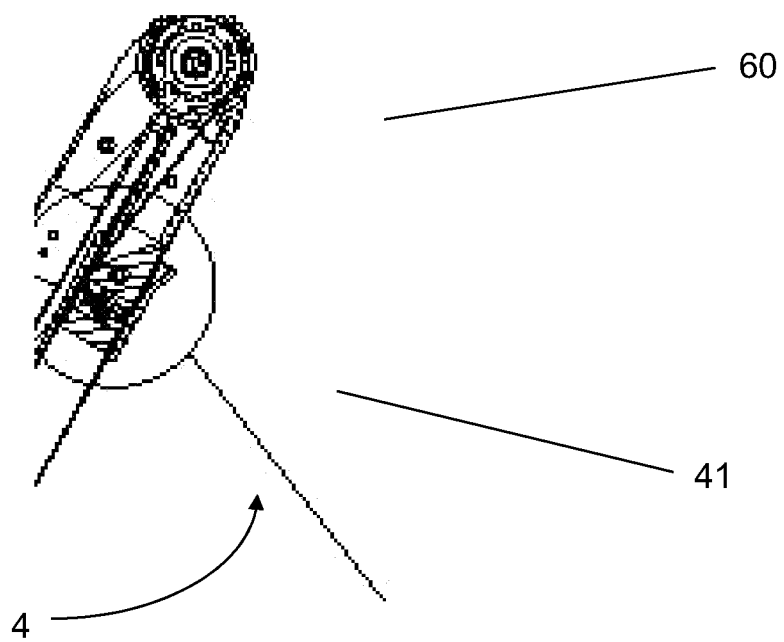
FIG. 9B is a further enlarged view of the locking mechanism in the unlocked state.

As shown in FIG. 6, the locking mechanism 4 is provided between the handlebar set 15 and the slider 16, and the locking mechanism 4 is configured to lock the frame 1 in an unfolded state. After the locking mechanism 4 is unlocked, the frame 1 of the stroller can be collapsed from an unfolded state to a folded state. The front leg set 11, the rear leg set 12, the seat set 13, the side armrest 14, and the handlebar set 15 can be relatively rotated. Thus, the frame 1 of the stroller is fully folded to reduce the space occupied by the stroller, allowing easy carrying and transportation. The present invention has a simple structure, is easy to produce and assemble, and has a low production cost.

As shown in FIG. 1, in the present embodiment, the front wheel assembly 2 is rotatably connected to the lower end of the front leg set 11, and the rear wheel assembly 3 is rotatably connected to the lower end of the rear leg set 12.

As shown in FIGS. 5 to 9, the locking mechanism 4 comprises a locking pin 41 and a locking hole 42, the locking pin 41 being disposed on the handlebar set 15, the locking hole 42 being disposed in the slider 16, the frame 1 being in a locked state when the locking pin 41 is inserted into the locking hole 42, and the frame 1 being in an unlocked state when the locking pin 41 is disengaged from the locking hole 42. When the frame 1 is in the locked state, since the locking pin 41 located in the handlebar set 15 is inserted into the locking hole 42 of the slider 16, the slider 16 cannot be slid. In this case, the frame 1 cannot collapse from an unfolded state to a folded state, thus preventing the frame 1 from unexpectedly collapsing and injuring the baby when the stroller is used. When the frame 1 is in the unlocked state, the locking pin 41 is disengaged from the locking hole 42, and the slider 16 can slide along the length of the handlebar set 15. In this case, the frame 1 can collapse from an unfolded state to a folded state. In addition, the locking mechanism 4 of the present invention has a simple structure and functions reliably.

The locking pin 41 comprises a stopper portion 411 and a locking portion 412 that extends laterally from the stopper portion 411. The locking portion 412 is inserted into the locking hole 42, and the stopper portion 411 is limited to one side of the locking hole 42. The stopper portion 411 is configured to limit the position of the locking portion 412 to prevent the locking portion 412 from being excessively inserted.

The locking mechanism 4 further comprises a spring 43, a cylindrical support portion 4121 is provided in a central portion of the locking portion 412, the locking portion 412 is recessed with an accommodating space 4122.

The handlebar set 15 comprises an upper handlebar set 151 and a lower handlebar set 152, and a joint head 153 between the upper handlebar set 151 and the lower handlebar set 152, and the upper handlebar set 151 can be rotated relative to the lower handlebar set 152 by the joint head 153.

The lower handlebar set 152 comprises an insert 1521, one end of the spring 43 extends into the accommodating space 4122 and abuts against the cylindrical support portion 4121, and the other end of the spring 43 abuts against the insert 1521. By providing the spring 43, the locking mechanism 4 has a function of automatic restoration. When the frame 1 is opened from a folded state to an unfolded state, the locking pin 41 is automatically inserted into the locking hole 42 by the elastic force of the spring 43. Thus, the frame 1 can be automatically locked, without the need of manual locking. This prevents any adverse consequences when a user forgets to lock a stroller when using it.

The locking mechanism 4 further comprises a linkage member. One end of the linkage member is connected to the locking pin 41, and the other end of the linkage member is connected to the joint head 153. In an embodiment, the linkage member is a pull cord, in particular a steel cord 60 (see FIG. 9B), also referred to as a pull cord 60, one end of the steel cord 60 being connected to the locking pin 41, the other end of the steel cord 60 being connected to the joint head 153. To fold the frame 1, it is only necessary to rotate the upper handlebar set 151, and, at the same time, the joint head 153 rotates, thereby driving the steel cord to move, so that the locking pin 41 is disengaged from the locking hole 42 and the spring 43 is in a compressed state. In this case, the frame 1 is in the unlocked state, and can be smoothly collapsed from an unfolded state to a folded state. During the folding, gravity assists in the folding movement.

To open the frame 1, first unfold the other parts of the frame 1 in turn, and then rotate the upper handlebar set 151 in the opposite direction, and the joint head 153 is simultaneously rotated. The locking pin 41 is inserted into the locking hole 42 by the elastic force of the spring 43, so that the frame 1 is in the locked state when unfolded.

As shown in FIG. 1, the handlebar set 15 further comprises a connecting member 154 that is connected to the lower portion of the lower handlebar set 152, in particular to the lower end of the lower handlebar set 152. The middle portion of the rear leg set 12 is rotatably connected to the connecting member 154 via its connection with the lower handlebar set. The rear portion of the seat set 13, in particular the rear end of the seat set 13, is rotatably connected to the connecting member 154. In other words, the rotatable connection between the middle portion of the rear leg set 12 and the rear portion of the seat set, in particular the rear end of the seat set 13 occurs via the lower portion of the handlebar set 15, in particular the lower end of the handlebar set 15 and via the connecting member 154.

Figure 10:
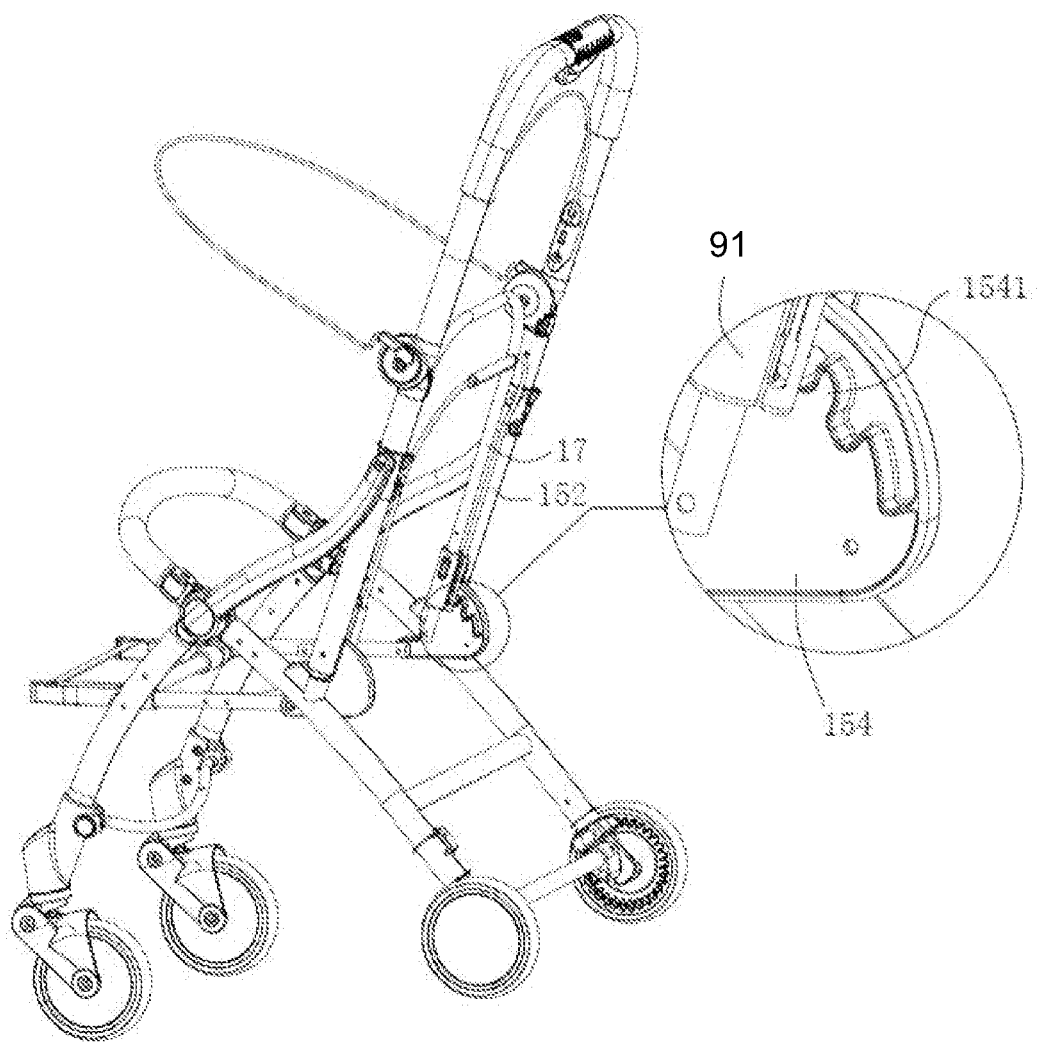
FIG. 10 is a perspective view and a partial enlarged view of the frame of the present invention and the backrest bar.

As shown in FIG. 10, the frame 1 further comprises a backrest bar 91, the backrest bar 91 being connected to the connecting member 154. The backrest bar 91 is used for mounting a baby's back cushion. The connecting member 154 is provided with a plurality of tooth portions 1541. The backrest bar 91 can be rotated to engage with the different tooth portions 1541, thereby adjusting the angle of the backrest cushion so that the baby feels more comfortable when sitting in the stroller.

Figure 12:
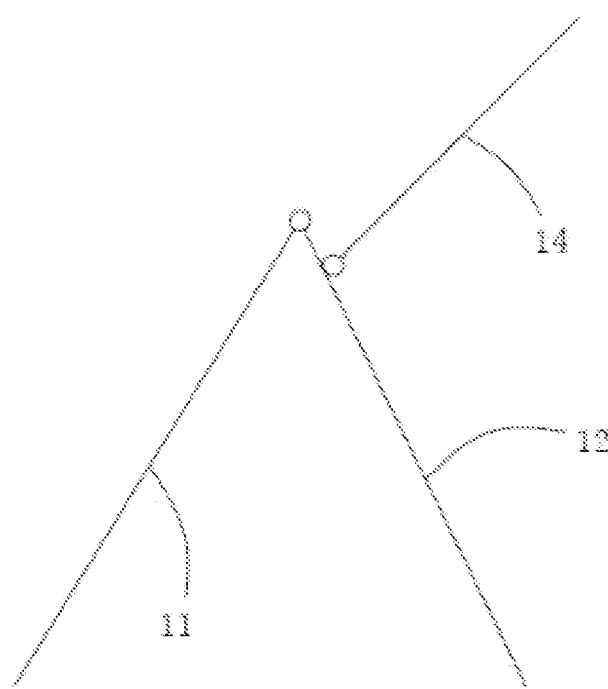
FIG. 12 is a schematic view showing an example embodiment of the connection relationship between the front leg set, the rear leg set, and the side armrest according to the present invention.

FIG. 12 is a schematic view showing an example embodiment of the connection relationship between the front leg set, the rear leg set, and the side armrest according to the present invention, wherein the upper portion of the rear leg set 12 is rotatably connected to the upper portion of the front leg set 11, and the upper portion of the front leg set 11 is not rotatably connected to the lower portion of the side armrest 14. In one embodiment, the upper end of the rear leg set 12 is rotatably connected to the upper end of the front leg set 11, and the upper end of the front leg set 11 is not rotatably connected to the lower end of the side armrest 14.

Figure 13:
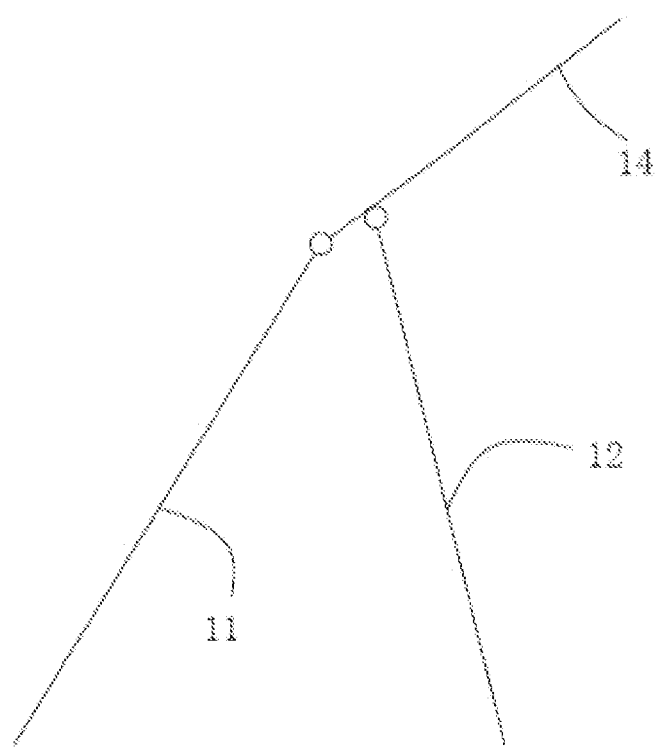
FIG. 13 is a schematic view showing a third embodiment of the connection relationship between the front leg set, the rear leg set, and the side armrest according to the present invention.

FIG. 13 is a schematic view showing a third embodiment of the connection relationship between the front leg set, the rear leg set, and the side armrest according to the present invention, wherein the upper portion of the front leg set 11 is rotatably connected to the lower portion of the side armrest 14, and the upper portion of the front leg set 11 is not rotatably connected to the upper end of the rear leg set 12. In an embodiment, the upper end of the front leg set 11 is rotatably connected to the lower end of the side armrest 14, and the upper end of the front leg set 11 is not rotatably connected to the upper end of the rear leg set 12.

While the present invention has been specifically described above with reference to preferred embodiments, it should be understood that said embodiments are not intended to limit the present invention and that those of ordinary skill in the art can make various modifications, equivalent substitutions, and improvements without departing from the spirit and scope of the present invention as defined by the claims.

As shown in FIGS. 14 to 20, a further embodiment of a collapsible stroller frame, in particular an automatically collapsible stroller frame of the present invention comprises: a front leg set 11, the front leg set 11 comprising a front leg bar 111; and a rear leg set 12, the rear leg set 12 comprising a rear leg bar 121.

The stroller frame further comprises a handlebar set 15. The handlebar set 15 is provided with a slider 16 that is slidable along its axial direction. In one embodiment, the handlebar set 15 comprises a lower handlebar tube 152 and a U-shaped upper handlebar tube 151 that is rotatably disposed at an upper end of the lower handlebar tube 152, the lower handlebar tube 152 being provided with the slider 16 that is slidable along its axial direction.

A locking assembly 4 is provided between the handlebar set 15 and the slider 16 for locking or unlocking the slider 16, the handlebar set 15 is hinged to the rear leg bar 121, and a transmission member 14 is hinged between the slider 16 and the rear leg bar 121 or the front leg bar 111.

In one embodiment, the locking assembly 4 is provided between the lower handlebar tube 152 and the slider 16 for locking or unlocking the slider 16 so that it is fixed to the lower handlebar tube 152 or is slidable in the axial direction of the lower handlebar tube 152. The lower handlebar tube 152 is hinged to the rear leg bar 121. For example, the lower end of the lower handlebar tube 152 is hinged to the rear leg bar 121, in particular to the middle portion of the rear leg bar 121. A transmission member 14 is hinged between the slider 16 and the upper portion of the rear leg bar 121 or the upper portion of the front leg bar 111.

Figure 20:
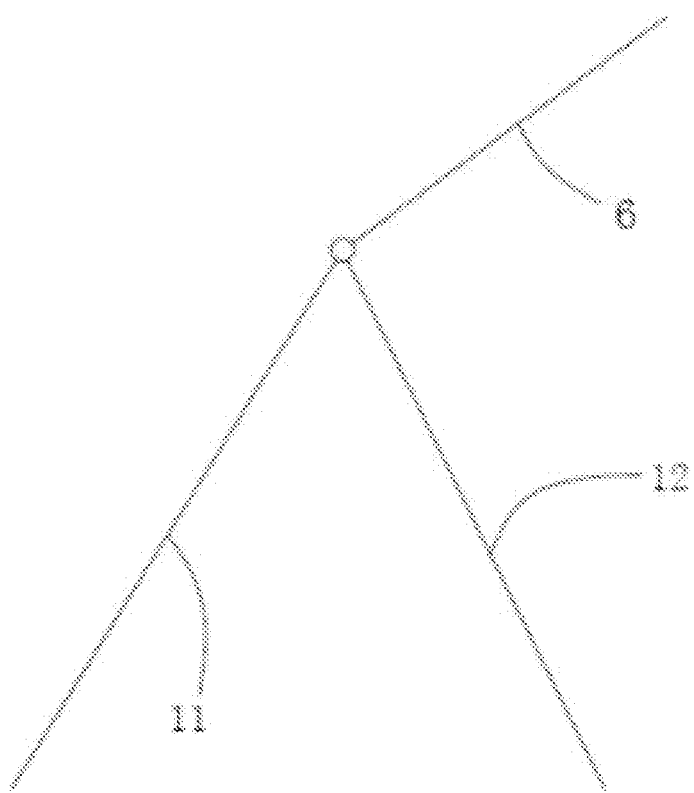
FIG. 20 is a schematic diagram showing the configuration in which the upper end of the front leg bar, the lower end of the transmission member, and the upper end of the rear leg bar are coaxially hinged.

The upper end of the front leg bar 111 is hinged to the lower end of the transmission member 14 and/or the upper end of the rear leg bar 121. In one embodiment, as shown in FIG. 20, the upper end of the front leg bar 111, the lower end of the transmission member 14, and the upper end of the rear leg bar 121 are coaxially hinged.

The stroller frame further comprises an elastic member 43, the elastic member 43 being a spring or a rubber band. The elastic member 43 is associated with the front leg bar 111 and the rear leg bar 121 such that when the stroller frame collapses, the front leg bar 111 and the rear leg bar 121 are automatically brought close together under the elastic pulling of the elastic member 43, thereby completing the collapsing In one embodiment, the elastic member 43 is disposed between the front leg bar 111 and the rear leg bar 121 such that when the stroller frame collapses, the front leg bar 111 and the rear leg bar 121 are automatically brought close together under the elastic pulling of the elastic member 43, thereby completing automatic collapsing. When the upper handlebar tube 151 is rotated relative to the lower handlebar tube 152, the locking assembly 4 unlocks the slider 16, and the front leg bar 111 and the rear leg bar 121 are automatically brought close together by the elastic pulling of the elastic member 43. At the same time, the transmission member 14 drives the slider 16 to slide down the axial direction of the lower handlebar tube 152 to drive the lower handlebar tube 152 towards the direction of the rear leg bar 121, thereby collapsing the whole stroller frame, which is very fast and convenient. Gravity and the force from the elastic member 7 cooperate during the folding movement.

The stroller frame further comprises a seat set 13, the seat set 13 being hinged to the front leg bar 111, the seat set 13 being hinged to the lower end of the lower handlebar tube 152, in particular via a connecting base 154.

In an embodiment, the front portion of the seat set 13 is hinged to a middle portion of the front leg bar 111. The rear end of the seat set 13 is hinged to the lower end of the lower handlebar tube 152, in particular via a connecting base 154. The front end of the elastic member 43 is fixed to the seat set 13. The elastic member 43 may be fixed to the front portion or to a middle portion of the seat set. The elastic member 43 acts between the seat set 13 and the rear leg bar 121. When the stroller collapses, the front leg bar 111 and the rear leg bar 121 are automatically brought together, and the seat set 13 is also rotated forward to move towards the front leg bar 111. It will be clear to the skilled person that the elastic member 43 can be arranged slightly differently, while maintaining the same functionality of pulling the front leg bar 111 and the rear leg bar 121 toward one another during the folding movement.

The stroller further comprises a backrest set 9, the backrest set 9 comprising a U-shaped backrest bar 91, the connecting base 154 being connected to the lower end of the lower handlebar tube 152 which in turn is hinged to the middle portion of the rear leg bar 121. The end of the backrest bar 91 is hinged to the connecting base 154.

The rear end of the elastic member 43 is directly or indirectly fixed to the connecting base 154. For instance, the rear end of the elastic member 43 may be connected to a transverse rod which interconnects the right and left connecting base 154. Certainly, the rear end of the elastic member 43 is also directly fixable to the rear leg bar 121. When the stroller collapses, the front leg bar 111 and the rear leg bar 121 are automatically brought together, driving the connecting base 154 and the backrest bar 91 to, following the lower handlebar tube 152, move towards the rear leg bar 121.

The locking assembly 4 comprises a locking pin 41 provided in the lower handlebar tube 152 and a locking hole 42 provided in the slider 16, and the locking pin 41 can penetrate the lower handlebar tube 152 and be elastically engaged in the locking hole 42. When the locking assembly 4 is in the locked state, the locking pin 41 in the lower handlebar tube 152 is engaged in the locking hole 42 of the slider 16, so that the slider 16 is not slidable relative to the lower handlebar tube 152. In this case, the stroller frame is not collapsible from an unfolded state to a folded state, and thus the stroller frame does not unexpectedly collapse and injure the baby when the stroller is used. When the locking assembly 4 is in the unlocked state, the locking pin 41 is disengaged from the locking hole 42, and the slider 16 is slidable along the axial direction of the lower handlebar tube 152. In this case, the stroller frame is collapsible from an unfolded state to a folded state. In addition, the locking assembly 4 of the present invention has a simple structure and operates reliably.

A rotating base 153 is provided between the lower handlebar tube 152 and the upper handlebar tube 151, and a linkage member, in particular a pull cord (60, see FIG. 19B) is disposed between the rotating base 153 and the locking pin 41. To fold the stroller frame, it is only necessary to rotate the upper handlebar tube 151 so that it rotates relative to the lower handle bar tube 152 and is folded. In this case, the rotating base 153 rotates at the same time, thereby driving the pulling cord to move so that the locking pin 41 is disengaged from the locking hole 42. In this case, the locking assembly 4 is in an unlocked state, and the stroller frame is automatically collapsible from an unfolded state to a folded state. When it is necessary to unfold the stroller frame, first unfold the other parts of the stroller frame in turn, and then rotate the upper handlebar tube 151 in the opposite direction, and the rotating base 153 rotates at the same time. The locking pin 41 is reset by the elastic force and inserted into the locking hole 42 so that the locking assembly 4 is locked when the stroller frame is an unfolded state.

The upper handlebar tube 151 is provided with an unlocking member 50 for unlocking or locking the upper handlebar tube 151 so that it is rotatable or fixed relative to the lower handlebar tube 152. To fold the stroller frame, it is only necessary to operate the unlocking member 50 so that the upper handlebar tube 151 is unlocked and operate it to rotate relative to the lower handlebar tube 152 and fold, thereby realizing automatic collapsing. When the stroller frame is unfolded, the unlocking member 50 locks the upper handlebar tube 151 so that it is not rotatable relative to the lower handlebar tube 151.

Figure 21:
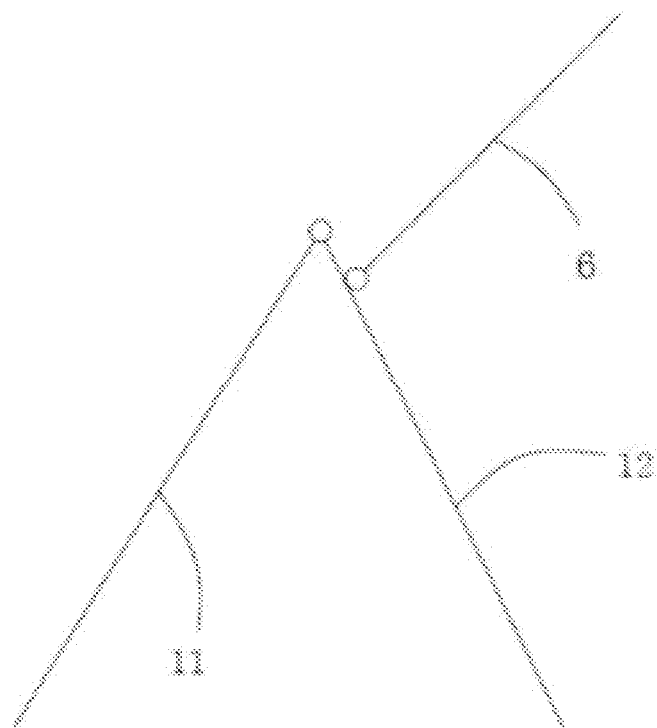
FIG. 21 is a schematic view showing the configuration in which the upper end of the front leg bar is hinged to the upper end of the rear leg bar and is not hinged to the lower end of the transmission member.

Another embodiment of the present invention as shown in FIG. 21 differs from the above-mentioned configuration only in that the upper end of the front leg bar 111, the lower end of the transmission member 14, and the upper end of the rear leg bar 121 are not coaxially hinged. Instead, the upper end of the front leg bar 111 is hinged to the upper end of the rear leg bar 121 and is not hinged to the lower end of the transmission member 14. Although the connection relationship of the front leg bar 111, the transmission member 14, and the rear leg bar 121 which may be slightly different from that of other example embodiments, it is also possible to achieve all the technical effects of the same.

Figure 22:
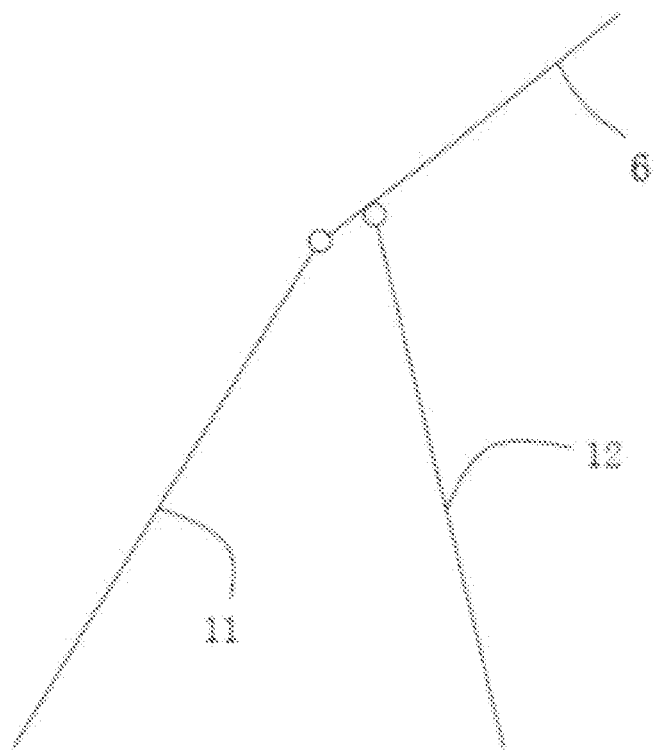
FIG. 22 is a schematic view showing the configuration in which the upper end of the front leg bar is hinged to the lower end of the transmission member and is not hinged to the upper end of the rear leg bar.

A further embodiment of the present invention as shown in FIG. 22 differs from the above-mentioned configuration only in that the upper end of the front leg bar 111, the lower end of the transmission member 14, and the upper end of the rear leg bar 121 are not coaxially hinged. Instead, the upper end of the front leg bar 111 is hinged to the lower end of the transmission member 14 and is not hinged to the upper end of the rear leg bar 121. Although the connection relationship of the front leg bar 111, the transmission member 14, and the rear leg bar 121 is slightly different from that of some example embodiments of the present invention, it is also possible to achieve all the technical effects of the same.

Figure 14:
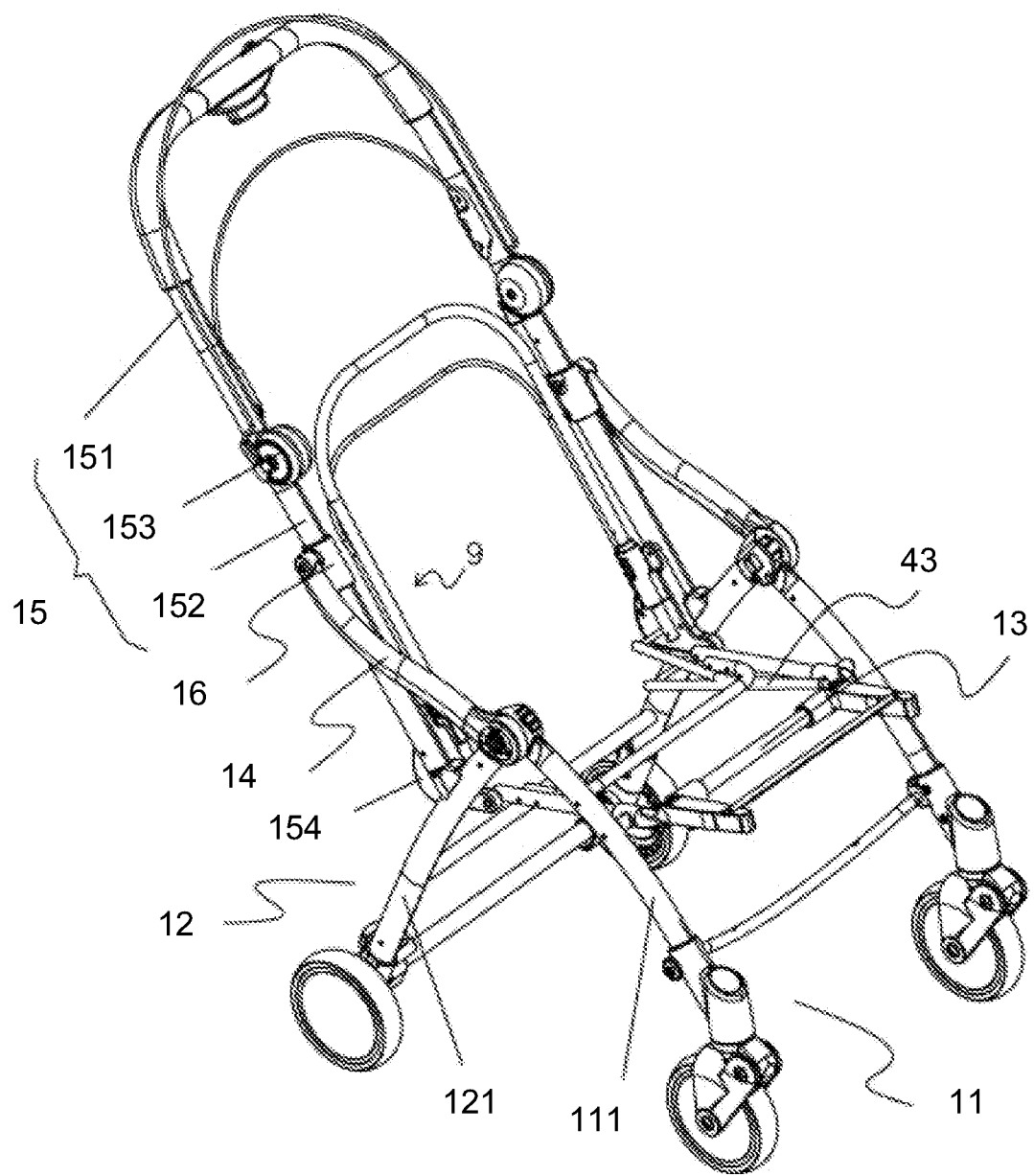
FIG. 14 is an example structural diagram of the present invention when it is unfolded.
Figure 15:
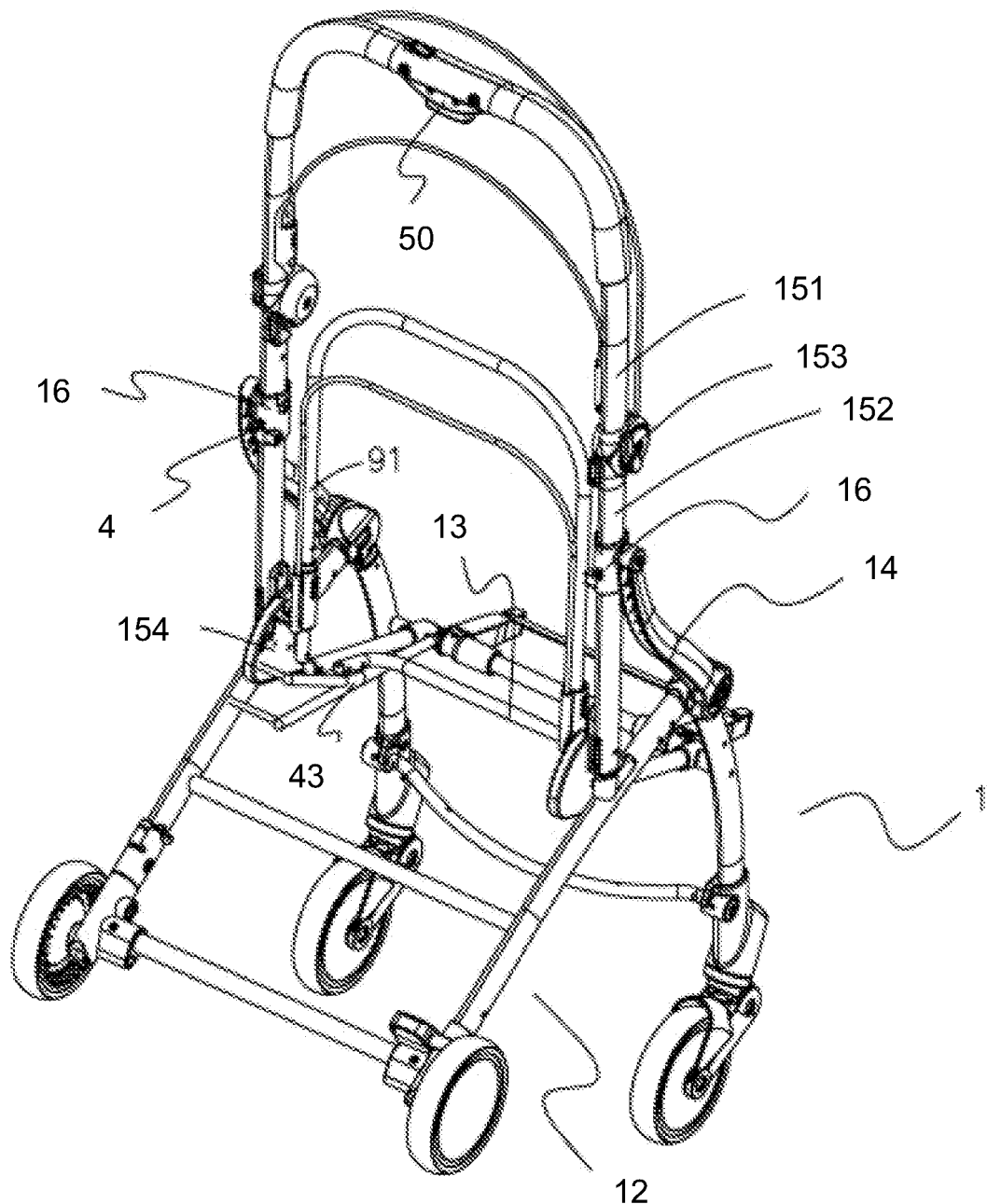
FIG. 15 is another example structural diagram of the present invention when it is unfolded.

When the present invention is used, the stroller frame is unfolded to a state shown in FIG. 14 or FIG. 15 (the unfolding operation still needs to be manually performed). To collapse the stroller, it is only necessary to operate the unlocking member 50 so that the upper handlebar tube 151 is unlocked and operate it to rotate relative to the lower handlebar tube 152 and fold. In this case, the rotating base 153 rotates at the same time, thereby driving the pulling cord to move so that the locking pin 41 is disengaged from the locking hole 42. In this case, the locking assembly 4 is in an unlocked state.

Figure 16:
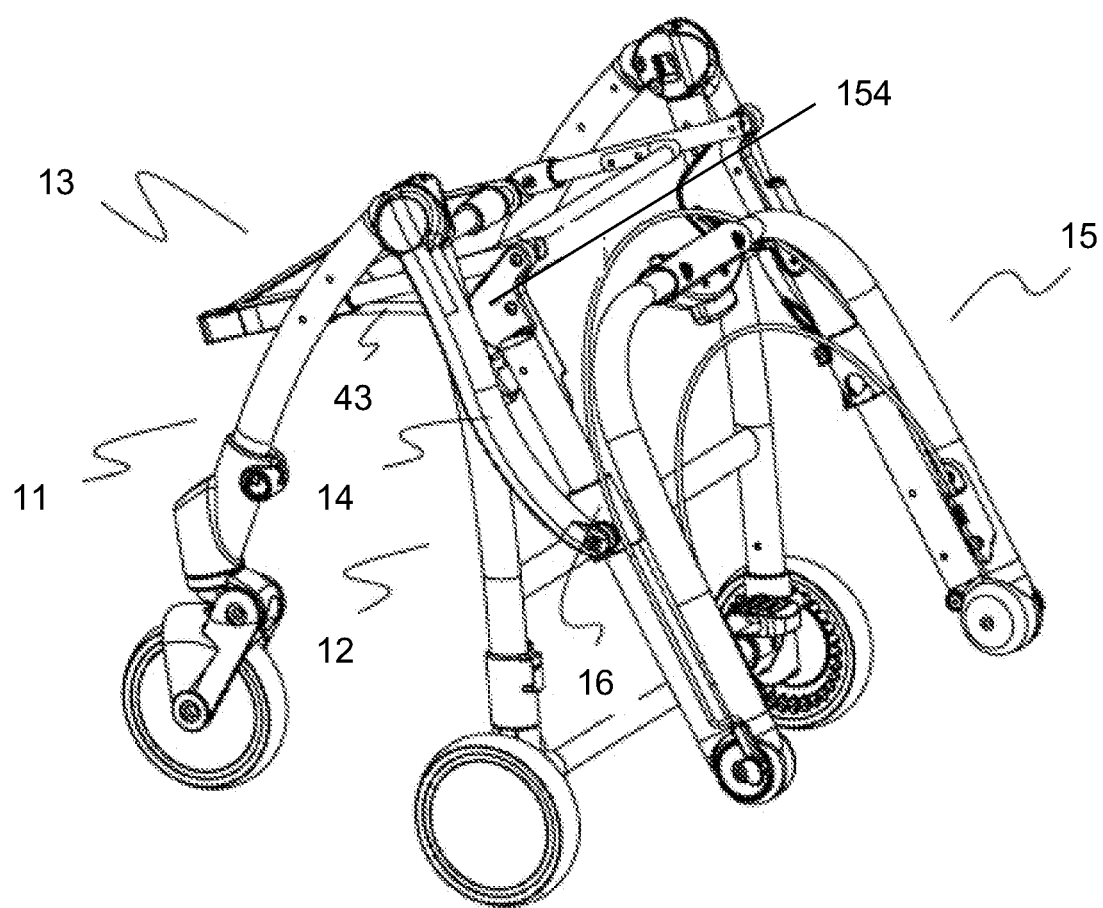
FIG. 16 is a structural view of the present invention when the stroller collapses.

As shown in FIG. 16, under the elastic pull of the elastic member 43, the front leg bar 111 and the rear leg bar 121 are automatically brought together, and the seat set 13 also rotates forward to move towards the front leg bar 111. At the same time, the transmission member 14 drives the slider 16 to slide down the axial direction of the lower handlebar tube 152, thereby driving the lower handlebar tube 152 to move towards the rear leg bar 121. The connecting base 154 and the backrest bar 91 are rotated to, following the lower handlebar tube 152, move towards the rear leg bar 121, thereby collapsing the whole stroller frame, which is very quick and convenient.

Figure 17:
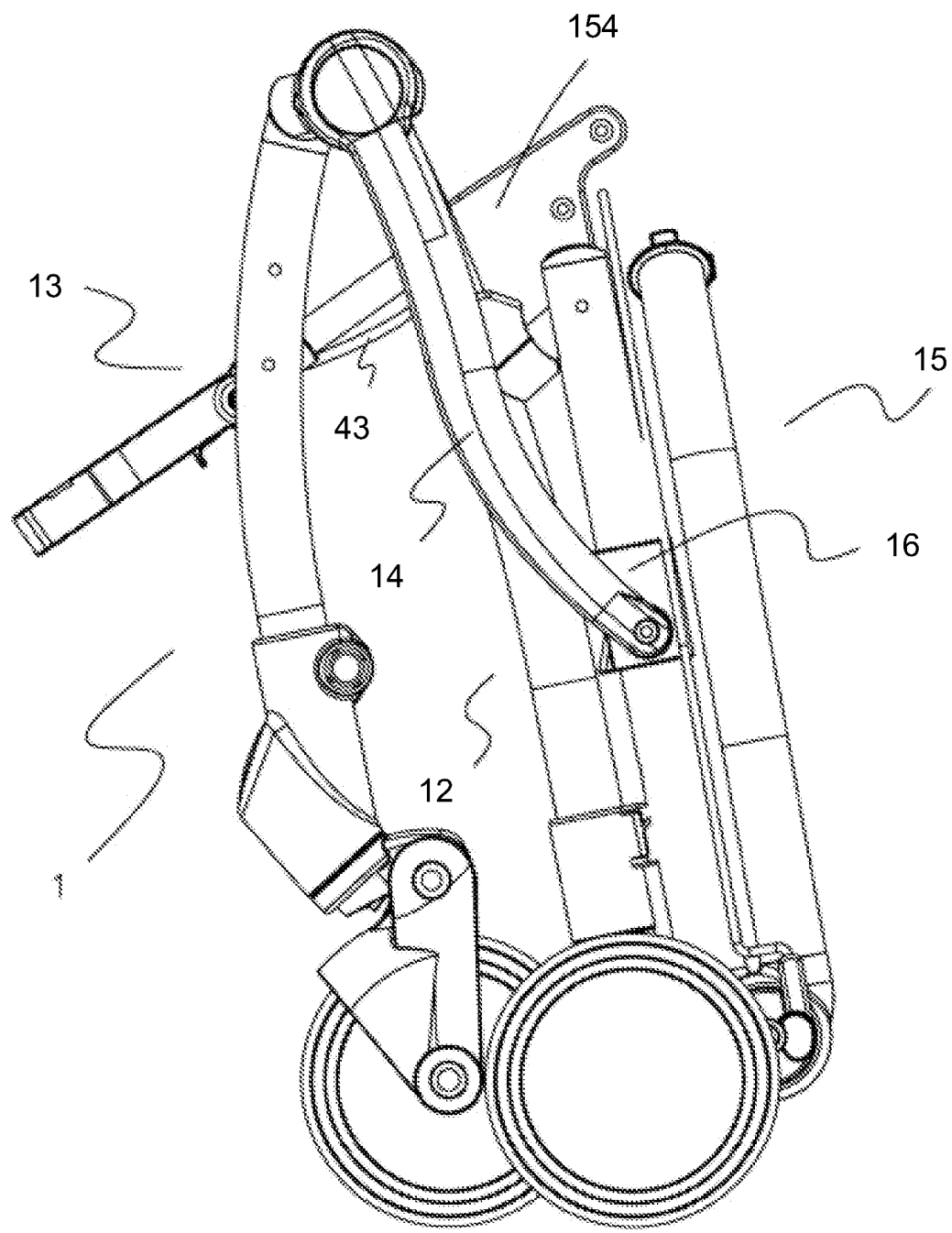
FIG. 17 is a structural view of the present invention after collapsing of the stroller.
Figure 18:
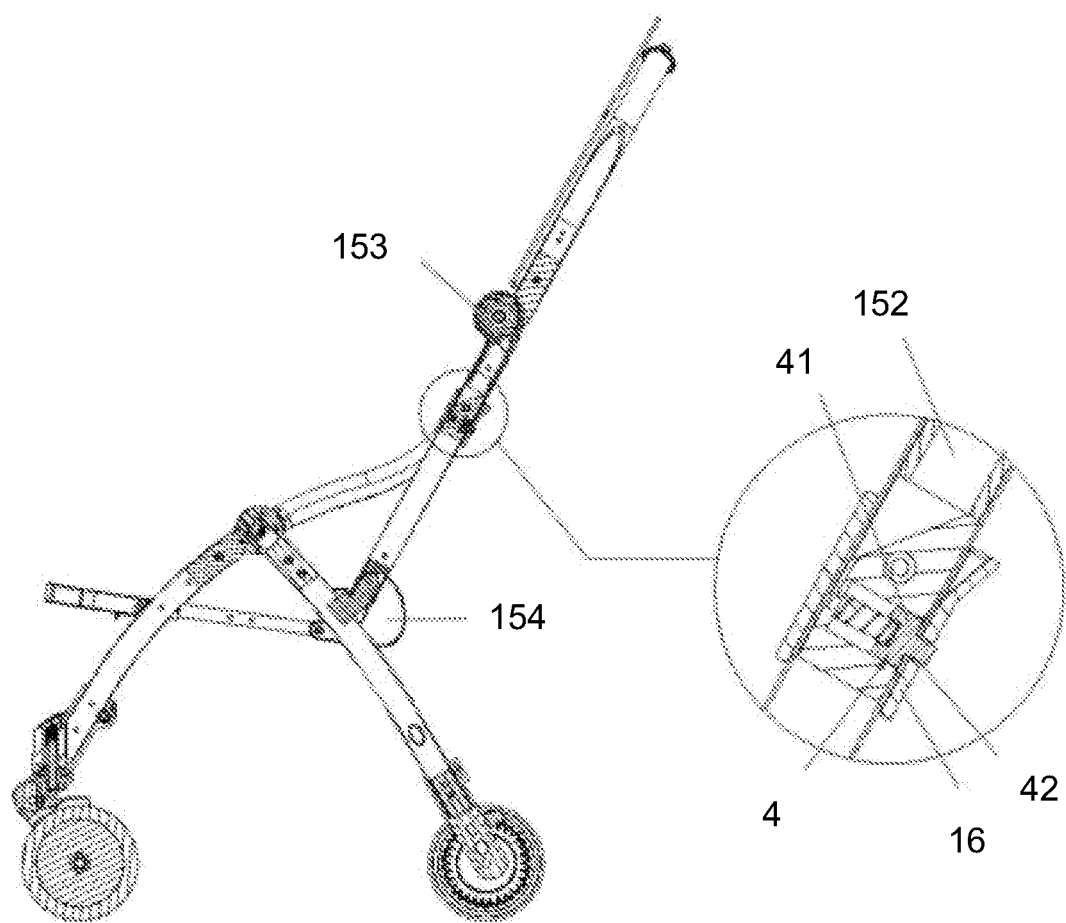
FIG. 18 is a cross-sectional view of the locking assembly of the present invention in the locked state.
Figure 19A:
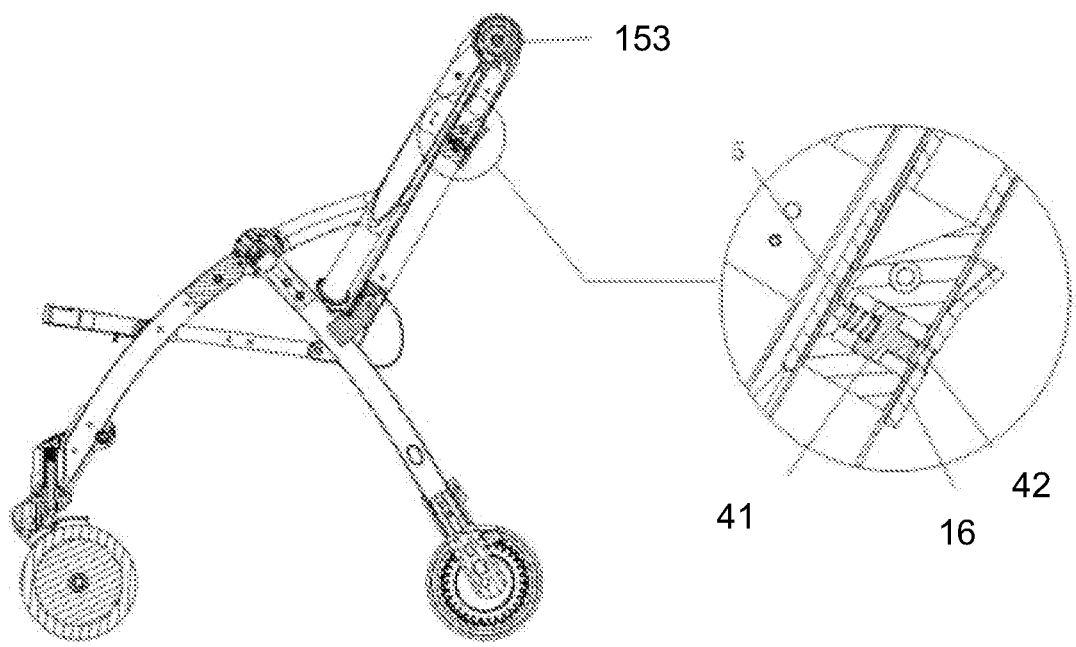
FIG. 19A is a cross-sectional view of the locking assembly of the present invention in an unlocked state.
Figure 19B:
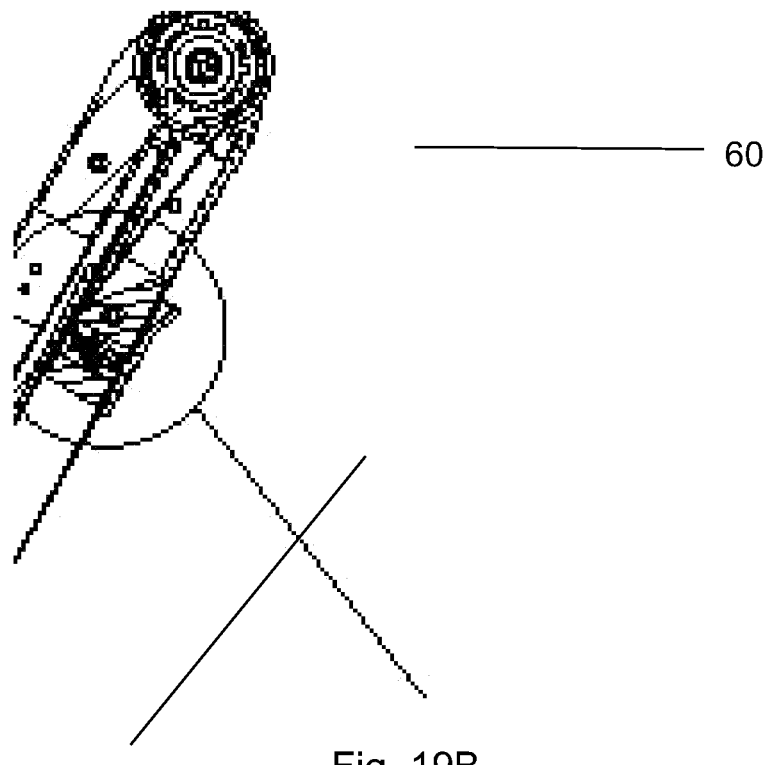
FIG. 19B is a further enlarged view of the locking assembly in the unlocked state.

As shown in FIG. 17, the collapsed stroller frame, supported by the front and rear castors, stands upright. Therefore, it is possible to place the collapsed stroller upright without the need of laying it flat, thereby saving floor space.

The term "middle portion" as used herein, for instance in connection with the front leg set and the rear leg set is to be interpreted broadly and refers to the portion between the opposing ends thereof.

While the present invention has been particularly described above with reference to preferred embodiments, it should be understood that said embodiments are not intended to limit the present invention and that those of ordinary skill in the art can make various modifications, equivalent substitutions, and improvements without departing from the spirit and scope of the present invention as defined by the claims. As such, the foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertains that variations and modifications of the various implementations shown and described herein may be made without departing from the spirit and scope of the embodiments. Accordingly, it is intended that the embodiments be limited only to the extent required by the applicable rules of law.

What is claimed is:

1. A stroller system, comprising:
   a collapsible frame with a bottom and a top, the collapsible frame including,
   a front leg set,
   a rear leg set with an upper portion a middle portion, and a lower portion,
   a seat set,
   a side armrest with an upper and lower portion,
   a handlebar set with an upper portion and a lower portion, and
   a slider, configure to slide along the handlebar set upper portion,
wherein the upper portion of the side armrest being rotatably connected to the slider,
   wherein the lower portion of the side armrest being rotatably connected to the front leg set and to the rear leg set;
   the rear leg set being rotatably connected to the lower portion of the handlebar set,
   wherein at least one of the rear leg set and the side armrest being rotatably connected to the front leg set;
   the front leg set being rotatably connected to the seat set;
   the seat set being rotatably connected to the lower portion of the handlebar set, via a connecting member;

a front wheel assembly, disposed at a front portion of the bottom of the collapsible frame;
a rear wheel assembly, disposed at a rear portion of the bottom of the frame; and
a locking mechanism, disposed between the handlebar set and the slider, the locking mechanism being configured to lock the frame in an unfolded state;
wherein the handlebar set includes an upper handlebar set and a lower handlebar set, and a joint head disposed between the upper handlebar set and the lower handlebar set;
wherein the locking mechanism further comprises a spring, a central portion of a locking portion is provided with a cylindrical support portion, the locking portion is recessed with an accommodating space, the lower handlebar set comprises an insert, one end of the spring extends into the accommodating space and abuts against the cylindrical support portion, and the other end of the spring abuts against the insert.

2. The stroller system of claim 1, wherein the lower portion of the side armrest is rotatably connected to the upper portion of the rear leg set, the rear leg set being rotatably connected to the lower portion of the handlebar set, the middle portion of the rear leg set being rotatably connected to the lower portion of the handlebar set, at least one of the upper end of the rear leg set and the lower end of the side armrest being rotatably connected to the upper end of the front leg set, and wherein the middle portion of the front leg set is rotatably connected to the seat set.

3. The stroller system of claim 1, wherein the rear end of the seat set is rotatably connected to the lower end of the handlebar set.

4. The stroller system of claim 1, wherein the locking mechanism includes a locking pin and a locking hole, the locking pin being disposed on the handlebar set, the locking hole being disposed in the slider, the frame being in a locked state when the locking pin is inserted into the locking hole, and wherein the frame is in an unlocked state when the locking pin is disengaged from the locking hole.

5. The stroller system of claim 1, wherein the locking mechanism further includes a linkage member, with a steel pull cord, wherein a first end of the linkage member is connected to the locking pin, and a second end of the linkage member being connected to the joint head.

6. The stroller system of claim 5, wherein the handlebar set the connecting member is connected to the lower portion of the handlebar set, the middle portion of the rear leg set is rotatably connected to the connecting member via the lower portion of the handlebar set, and the rear portion of the seat set is rotatably connected to the connecting member.

7. The stroller system of claim 1, wherein the middle portion of the front leg set is rotatably connected to the seat set.

8. A stroller system, comprising:
a collapsible frame with a bottom and a top, the collapsible frame including,
a front leg set,
a rear leg set with an upper portion a middle portion, and a lower portion,
a seat set,
a side armrest with an upper and lower portion,
a handlebar set with an upper portion and a lower portion, and
a slider, configure to slide along the handlebar set upper portion,
wherein the upper portion of the side armrest being rotatably connected to the slider,
wherein the lower portion of the side armrest being rotatably connected to the front leg set and to the rear leg set;
the rear leg set being rotatably connected to the lower portion of the handlebar set,
wherein at least one of the rear leg set and the side armrest being rotatably connected to the front leg set;
the front leg set being rotatably connected to the seat set;
the seat set being rotatably connected to the lower portion of the handlebar set, via a connecting member;
a front wheel assembly, disposed at a front portion of the bottom of the collapsible frame;
a rear wheel assembly, disposed at a rear portion of the bottom of the frame; and
a locking mechanism, disposed between the handlebar set and the slider, the locking mechanism being configured to lock the frame in an unfolded state,
wherein the upper end of the front leg set, the upper end of the rear leg set, and the lower end of the side armrest are coaxially hinged.

9. A stroller system, comprising:
a frame with a top and a bottom, the frame configured to be collapsible from an unfolded state to a folded state, the frame including,
a front leg set,
a rear leg set with an upper and a lower portion,
a seat set,
a handlebar set with an upper and a lower portion,
wherein the upper portion of the rear leg set is rotatably connected to the lower portion of the handlebar set;
wherein the upper end of the rear leg set is rotatably connected to the upper end of the front leg set, and the rear leg set further being rotatably connected to the lower portion of the handlebar set;
wherein the seat set is connected to the lower portion of the handlebar set, the front leg set and the rear leg set;
a front wheel assembly disposed at a front portion of the bottom of the frame, the front wheel assembly including two front wheels,
a rear wheel assembly, disposed at a rear portion of the bottom of the frame, the rear wheel assembly including two rear wheels, and
a locking mechanism disposed on the handlebar set, the locking mechanism configured to lock the frame in an unfolded state,
wherein the handlebar set upper portion is U-shaped, and a joint head is disposed between the U-shaped upper handlebar portion and the lower handlebar portion,
wherein the U-shaped upper handlebar portion is pivotable relative to the lower handlebar portion and includes an unlocking member for unlocking the U-shaped upper handlebar portion so that it is rotatable and a locking member for locking the U-shaped upper handlebar set so that it is fixable relative to the lower handlebar set,
wherein the locking member includes a locking pin and a locking hole located in a portion of the frame below the joint head, the frame configured in a locked state when the locking pin is in an inserted position into the locking hole, and the frame being in an unlocked state when the locking pin is disengaged from the locking hole,
wherein the locking mechanism further comprises a linkage member, one end of the linkage member being connected to the locking pin, the other end of the linkage member being connected to the joint head, wherein the linkage member is pulled by a forward rotation of the U-shaped upper handlebar set relative to the lower handlebar set, thereby pulling the locking pin from the locking hole and unlocking the locking mechanism, causing the stroller to collapse to a folded state, wherein in the folded state the collapsed stroller frame stands upright.

10. The stroller according to claim 9, wherein the middle portion of the front leg set being rotatably connected to the seat set.

11. The stroller according to claim 9, wherein the rear end of the seat set being rotatably connected to the lower end of the handlebar set.

12. The stroller according to claim 9, wherein the locking mechanism further comprises a spring, a central portion of a locking portion is provided with a cylindrical support portion, the locking portion is recessed with an accommodating space, the lower handlebar set comprises an insert, one end of the spring extends into the accommodating space and abuts against the cylindrical support portion, and the other end of the spring abuts against the insert.

13. The stroller according to claim 9, wherein the upper end of the front leg set, the upper end of the rear leg set, and the lower end of the side armrest are coaxially hinged.

14. A collapsible stroller frame, comprising:
a front leg set, the front leg set comprising a front leg bar,
a rear leg set, the rear leg set comprising a rear leg bar,
a handlebar set being provided with a slider that is slidable along its axial direction,
a locking assembly being provided between the handlebar set and the slider for locking or unlocking the slider, the handlebar set being hinged to the rear leg bar,
a transmission member being hinged between the slider and the rear leg bar or the front leg bar, and
an elastic member being associated with the front leg bar and the rear leg bar such that when the stroller frame collapses, the front leg bar and the rear leg bar are brought close together under the elastic pulling of the elastic member, thereby completing the collapsing.

15. The collapsible stroller frame according to claim 14, the handlebar set comprising a lower handlebar tube and an upper handlebar tube that is rotatably disposed at an upper end of the lower handlebar tube, the lower handlebar tube being provided with the slider that is slidable along its axial direction, the locking assembly being provided between the lower handlebar tube and the slider, the lower handlebar tube being hinged to the rear leg bar.

16. The collapsible stroller frame according to any of claim 14, wherein the upper handlebar tube is U-shaped, the lower end of the lower handlebar tube being hinged to the rear leg bar, in particular to a middle portion thereof.

17. The collapsible stroller frame according to claim 14, wherein the stroller frame is automatically collapsible, wherein the front leg bar and the rear leg bar are automatically brought close together under the elastic pulling of the elastic member, thereby completing the collapsing.

18. The collapsible stroller frame according to claim 14, further comprising a seat set, the seat set being hinged to the front leg bar, the seat set being hinged to the lower end of the lower handlebar tube, in particular via a connecting base.

19. The collapsible stroller frame according to claim 18, the front end of the elastic member being fixed to the seat set, in particular fixed to a front portion or to a middle portion of the seat set.

20. The collapsible stroller frame according to claim 19, the front portion of the seat set being hinged to the middle portion of the front leg bar, the rear end of the seat set being hinged to the lower end of the lower handlebar tube, in particular via the connecting base.

21. The collapsible stroller frame according to claim 14, wherein the connecting base being connected to the lower end of the lower handlebar tube which is hinged to the middle portion of the rear leg bar.

22. The collapsible stroller frame according to claim 21, further comprising a backrest set, the backrest set comprising a U-shaped backrest bar, the end of the backrest bar being hinged to the connecting base.

23. The collapsible stroller frame according to claim 22, wherein the rear end of the elastic member is directly or indirectly fixed to the connecting base or directly fixed to the rear leg bar.

24. The collapsible stroller frame according to claim 14, wherein the locking assembly comprises a locking pin disposed in the lower handlebar tube and a locking hole disposed in the slider, and the locking pin can penetrate the lower handlebar tube and be elastically engaged in the locking hole, wherein a rotating base is disposed between the lower handlebar tube and the upper handlebar tube, and a pull cord is disposed between the rotating base and the locking pin.

25. The collapsible stroller frame according to claim 14, wherein the upper handlebar tube is provided with an unlocking member for unlocking the upper handlebar tube so that it is rotatable and locking the upper handlebar tube so that it is fixable relative to the lower handlebar tube.

26. The collapsible stroller frame according to claim 14, wherein the elastic member is a spring or rubber band.

* * * * *